United States Patent
Abe et al.

(10) Patent No.: US 11,681,261 B2
(45) Date of Patent: Jun. 20, 2023

(54) CONTROL SYSTEM, CONTROL METHOD, LEARNING DEVICE, CONTROL DEVICE, LEARNING METHOD FOR CONTROLLING AN OPERATION OF A SUBJECT DEVICE ON BASIS OF A DETEMINED COMMAND VALUE

(71) Applicant: OMRON Corporation, Kyoto (JP)

(72) Inventors: Yasuaki Abe, Takatsuki (JP); Yuki Ueyama, Kyoto (JP); Takashi Fujii, Kyoto (JP); Kazuhiko Imatake, Osaka (JP)

(73) Assignee: OMRON Corporation, Kyoto (JP)

( * ) Notice: Subject to any disclaimer, the term of this patent is extended or adjusted under 35 U.S.C. 154(b) by 317 days.

(21) Appl. No.: 17/052,523

(22) PCT Filed: Mar. 13, 2019

(86) PCT No.: PCT/JP2019/010189
§ 371 (c)(1),
(2) Date: Nov. 2, 2020

(87) PCT Pub. No.: WO2019/235018
PCT Pub. Date: Dec. 12, 2019

(65) Prior Publication Data
US 2021/0240144 A1 Aug. 5, 2021

(30) Foreign Application Priority Data
Jun. 7, 2018 (JP) .............................. JP2018-109630

(51) Int. Cl.
*G05B 13/02* (2006.01)
*G05B 13/04* (2006.01)

(52) U.S. Cl.
CPC ....... *G05B 13/0265* (2013.01); *G05B 13/041* (2013.01); *G05B 13/048* (2013.01)

(58) Field of Classification Search
CPC . G05B 13/0265; G05B 13/041; G05B 13/048
See application file for complete search history.

(56) References Cited

U.S. PATENT DOCUMENTS 11,493,903 B2 * 11/2022 Cella ................ G06Q 10/0639
2012/0271826 A1 * 10/2012 Kim ...................... G06Q 10/06
707/E17.089

(Continued)

FOREIGN PATENT DOCUMENTS

| CN | 1866286 | 11/2006 |
|---|---|---|
| CN | 101203818 | 6/2008 |

(Continued)

OTHER PUBLICATIONS

Full translation of JP 8-63203 (Sugita) previously included in applicant's IDS (Year: 1994).*

(Continued)

*Primary Examiner* — Suresh Suryawanshi
(74) *Attorney, Agent, or Firm* — JCIPRNET

(57) ABSTRACT

A control system estimates a numerical value range within which a command value can fall from a distribution of second data relating to the command value in a learning data set used to construct a prediction model, and in such a manner that a first acceptable range prescribed by a preset first threshold value with respect to a command value for a subject device is extended, decides a second threshold value with respect to the command value for the subject device on the basis of the estimated numerical value range. Further, in an operational phase, on the basis of an output value from the prediction model, the control system decides a command value for the subject device within a second acceptable range prescribed by the decided second threshold value, and controls an operation of the subject device on the basis of the decided command value.

20 Claims, 15 Drawing Sheets

(56) References Cited

U.S. PATENT DOCUMENTS

| | | | | |
|---|---|---|---|---|
| 2015/0379426 A1* | 12/2015 | Steele | ............... | G06N 5/025 706/12 |
| 2016/0078361 A1* | 3/2016 | Brueckner | ............ | H04L 67/10 706/12 |
| 2017/0004573 A1* | 1/2017 | Hussain | ............... | H04L 63/08 |
| 2017/0154283 A1* | 6/2017 | Kawai | ............... | G06F 11/006 |
| 2019/0138913 A1* | 5/2019 | Kakimoto | ............ | G06N 20/20 |
| 2019/0317477 A1* | 10/2019 | Liang | ............... | G05B 13/0265 |
| 2020/0361029 A1* | 11/2020 | Goya | ............... | G05B 19/19 |
| 2021/0011438 A1* | 1/2021 | Ueyama | ............ | G05B 13/041 |
| 2021/0240144 A1* | 8/2021 | Abe | ............... | G05B 13/041 |

FOREIGN PATENT DOCUMENTS

| | | |
|---|---|---|
| CN | 106815642 | 6/2017 |
| CN | 107290965 | 10/2017 |
| CN | 108076224 | 5/2018 |
| JP | H0863203 | 3/1996 |
| JP | H0988685 | 3/1997 |
| JP | 2000099107 | 4/2000 |
| JP | 2017102613 | 6/2017 |
| WO | 2016191092 | 12/2016 |

OTHER PUBLICATIONS

Dutta, Souradeep, et al. "Output range analysis for deep neural networks." arXiv preprint arXiv:1709.09130 (2017). (Year: 2017).*

Schwalbe, Gesina, and Martin Schels. "A survey on methods for the safety assurance of machine learning based systems." 10th European Congress on Embedded Real Time Software and Systems (ERTS 2020). 2020. (Year: 2020).*

Ghosh, Dhiren, and Andrew Vogt. "Outliers: An evaluation of methodologies." Joint statistical meetings. vol. 2012. 2012. (Year: 2012).*

"International Search Report (Form PCT/ISA/210) of PCT/JP2019/010189", dated Jun. 18, 2019, with English translation thereof, pp. 1-3.

"Written Opinion of the International Searching Authority (Form PCT/ISA/237) of CT/JP2019/010189", dated Jun. 18, 2019, with English translation thereof, pp. 1-8.

"Office Action of China Counterpart Application" with English translation thereof, dated Jan. 21, 2022, p. 1-p. 44.

"Search Report of Europe Counterpart Application", dated Jan. 31, 2022, p. 1-p. 9.

* cited by examiner

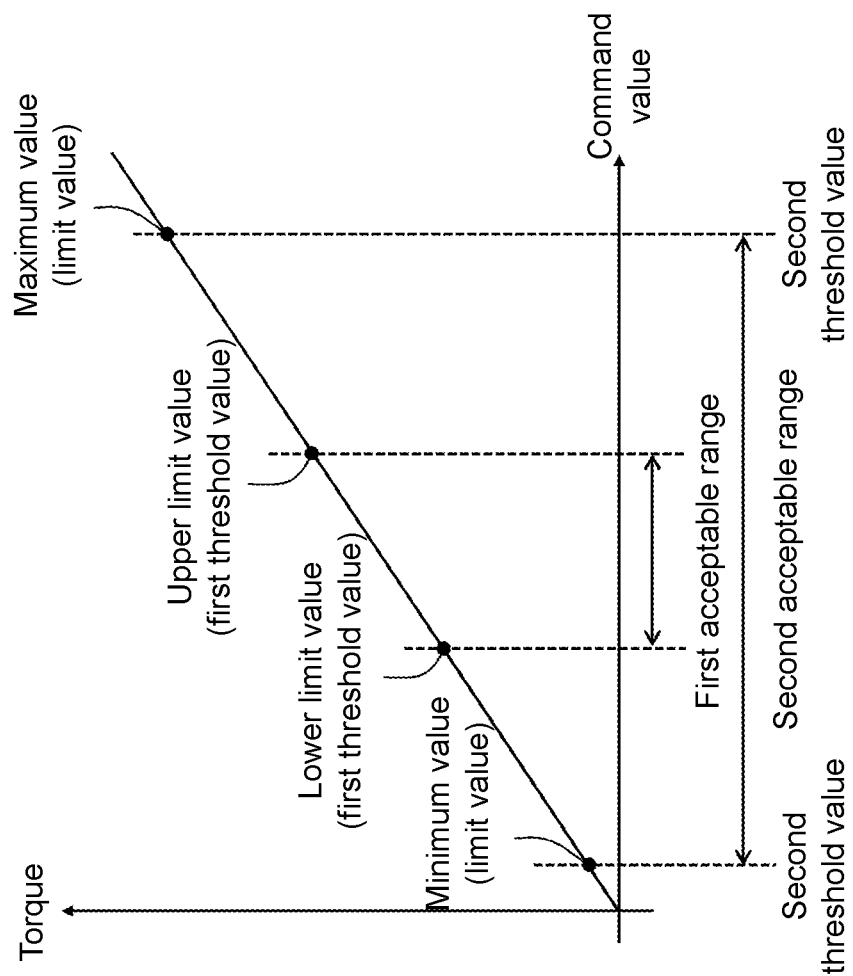

CONTROL SYSTEM, CONTROL METHOD, LEARNING DEVICE, CONTROL DEVICE, LEARNING METHOD FOR CONTROLLING AN OPERATION OF A SUBJECT DEVICE ON BASIS OF A DETEMINED COMMAND VALUE

CROSS-REFERENCE TO RELATED APPLICATION

This application is a 371 application of the International PCT application serial no. PCT/JP2019/010189, filed on Mar. 13, 2019, which claims the priority benefits of Japan Patent Application No. 2018-109630, filed on Jul. 7, 2018. The entirety of the above-mentioned patent application is hereby incorporated by reference herein and made a part of this specification.

BACKGROUND

Technical Field

The present invention relates to a control system, a control method, a learning device, a control device, a learning method, and a learning program.

Background Art

In recent years, prediction control technology for predicting a future state and controlling an operation suitable for the predicted future state in various devices has been developed. For example, Patent Literature 1 proposes a control system that includes a plurality of models of a control subject and calculates a predicted value of an amount of control using any one model. Specifically, this control system selects a model which is used for prediction operation depending on an external environment and determines an amount of operation using the selected model. Accordingly, it is possible to realize prediction control of a subject device depending on an external environment.

CITATION LIST

Patent Literature

[Patent Literature 1]
Japanese Patent Laid-Open No. 2000-099107

SUMMARY

Technical Problem

A prediction model is constructed using learning data which has been collected in advance. Accordingly, with this prediction model, a command value for a subject device can be appropriately determined in the same case as a situation represented by learning data or a case similar thereto, but there is a likelihood that the command value will be unable to be appropriately determined in an unknown case. In other words, the prediction model may output an unsuitable command value such as a value outside of a movable range or a value causing failure when an operation of a subject device is controlled in an unknown case. Therefore, when a prediction model is used, a constraint condition (a threshold value) for limiting a range of a command value is provided to secure safety of an operation of a subject device. For example, in the control system proposed in Patent Literature 1, an optimal amount of operation is determined from a predicted value of an amount of control which is predicted using a model in a preset constraint condition.

However, the inventors found that the following problems may occur in the control system according to the related art using such a preset constraint condition. That is, the constraint condition (threshold value) is basically set in advance by a user using the control system. At this time, there is a likelihood that the constraint condition will be set such that an acceptable range of the command value is narrower than a range satisfying safety due to excessive consideration of safety of an operation of a subject device. When the constraint condition is set in this way, the command value determined by the prediction model satisfies the safety but does not satisfy the constraint condition, and thus the command value is not accepted as a command value which is used for control of the subject device and prediction control cannot be appropriately performed. That is, in the control system using a preset constraint condition, the inventors found a problem that safety of an operation of a subject device can be secured but there is a likelihood that performance of a prediction model will be unable to be sufficiently exerted.

An aspect of the invention has been made in consideration of the aforementioned circumstances and an objective thereof is to provide technology for performing prediction control such that performance of a prediction model can be sufficiently exerted.

Solution to Problem

The invention employs the following configurations to solve the aforementioned problems.

That is, a control system according to an aspect of the invention includes: a learning data acquiring unit configured to acquire a plurality of learning data sets of which each includes a combination of first data associated with a factor determining an operation of a subject device and second data associated with a command value for the subject device which is adapted to the factor indicated by the first data; a learning processing unit configured to construct a prediction model that outputs a value corresponding to the second data when the first data is input for each of the acquired plurality of learning data sets; an estimation unit configured to estimate a possible numerical value range of the command value from a distribution of the second data in the acquired plurality of learning data sets; a threshold value determining unit configured to determine a second threshold value for the command value for the subject device on the basis of the estimated numerical value range such that a first acceptable range which is defined by a first threshold value preset for the command value for the subject device is extended; an input data acquiring unit configured to acquire input data associated with the factor in an operational phase; a prediction operation unit configured to acquire an output value from the prediction model by inputting the acquired input data to the prediction model and to determine the command value for the subject device within a second acceptable range which is defined by the determined second threshold value on the basis of the acquired output value; and an operation control unit configured to control the operation of the subject device on the basis of the determined command value.

The control system with this configuration estimates a possible numerical value range of the command value for the subject device from the distribution of the second data in the learning data set used to construct the prediction model.

Then, the control system with this configuration determines the second threshold value for the command value on the basis of the estimated numerical value range such that the first acceptable range which is defined by the first threshold value preset for the command value is extended. The control system with this configuration uses the second acceptable range which is defined by the second threshold value as the constraint condition of the command value. That is, the control system with this configuration determines the command value for the subject device within the second acceptable range defined by the second threshold value in the operational phase in which the prediction model is used.

Accordingly, even when the first acceptable range is set to be narrower due to excessive consideration of safety, it is possible to extend the range in which the command value used for control of the subject device is accepted using the second acceptable range set to extend the first acceptable range as the constraint condition. That is, some command values which are likely to be rejected when the first acceptable range is used as the constraint condition can be used for control of the subject device. Since the learning data sets can be collected to realize control of operations suitable for specific cases, it is possible to safely control the operation of the subject device with the command value which is designated on the basis of the second data in each learning data set. Accordingly, on the basis of the numerical value range which is estimated from the distribution of the second data in the learning data set, it is possible to determine the second threshold value defining the second acceptable range such that safety of the operation of the subject device is secured. Accordingly, with the control system with this configuration, it is possible to secure safety of an operation of a subject device and to perform prediction control in which performance of a prediction model can be sufficiently exerted.

"Subject device" may include all types of devices which are to be controlled and may include, for example, a production device configured to produce a product from a workpiece. A "prediction model" is not particularly limited as long as it is a model that can predict a command value for a production device at a time point (a future time point) after a time point at which a prediction process is performed, and may be appropriately selected depending on embodiments. For example, a learning model such as a decision tree, a neural network, or a support vector machine may be used as the "prediction model." "First data" may be data associated with all types of factors that can determine an operation of a subject device. "Second data" may include a value that directly designates a command value for a subject device (that is, the command value itself) or may include a value that indirectly designates the command value, such as a correction value for a reference value of the command value.

In the control system according to the aspect, the threshold value determining unit may employ a limit value of the estimated numerical value range or a value between the first threshold value and the limit value as the second threshold value. With this configuration, it is possible to appropriately determine the second threshold value such that prediction control in which performance of the prediction model can be sufficiently exerted can be performed.

In the control system according to the aspect, the first threshold value may be an upper limit value of the first acceptable range, and the threshold value determining unit may employ a value greater than the upper limit value as the second threshold value. With this configuration, it is possible to appropriately determine the second threshold value such that prediction control in which performance of the prediction model can be sufficiently exerted can be performed.

In the control system according to the aspect, the first threshold value may be a lower limit value of the first acceptable range, and the threshold value determining unit may employ a value less than the lower limit value as the second threshold value. With this configuration, it is possible to appropriately determine the second threshold value such that prediction control in which performance of the prediction model can be sufficiently exerted can be performed.

In the control system according to the aspect, the threshold value determining unit may determine the second threshold value such that a preset safety condition is satisfied. With this configuration, it is possible to reliably secure safety of the operation of the subject device. A "safety condition" may be appropriately set, may be defined by a threshold value, or may be defined by simulation or driving conditions of an actual machine.

In the control system according to the aspect, the second data may include a correction value for a reference value of the command value. With this configuration, it is possible to provide a control system that can appropriately determine the command value for the subject device using a correction value which is acquired from the prediction model.

In the control system according to the aspect, the subject device may be a production device that produces a product from a workpiece, and each of the first data and the input data may include at least one of a feature value of the workpiece and an attribute value of an environment in which the product is produced. With this configuration, it is possible to perform prediction control of a production device in which performance of the prediction model can be sufficiently exerted.

A "production device" is not particularly limited as long as it is a device that can perform a certain production process and be controlled, and may be, for example, a press machine, an injection molding machine, an NC lathe, an electric discharge machine, a packaging machine, a carrier machine, or a carrier mechanism in an inspection machine. A "workpiece" is not particularly limited as long as it can serve as a work object of a production device, and may be, for example, a raw material of a product, an object before being machined, or a part before being assembled. A "product" is obtained by allowing a production device to perform a production process on a workpiece and may include an intermediate product (a product under machining) in addition to a final product.

A "feature value of a workpiece" is not particularly limited as long as it can represent a certain feature of the workpiece, and may be appropriately selected depending on embodiments. A feature value of a workpiece may represent, for example, hardness, size, texture, weight, or heat. A feature value of a workpiece may directly represent a feature of the workpiece or may indirectly represent a feature of the workpiece. Directly representing a feature of a workpiece includes, for example, expressing hardness (a hardness level) of the workpiece in a numerical value, a class, or the like. On the other hand, indirectly representing a feature of a workpiece includes, for example, expressing a secondary index obtained at the time of measurement of hardness (a hardness level) of the workpiece (for example, a load applied to the workpiece or a torque applied at the time of measurement) in a numerical value, a class, or the like.

An "attribute value of an environment in which a product is produced" is not particularly limited as long as it can represent a certain attribute associated with an environment in which the production device operates, and may be appropriately selected depending on embodiments. The attribute value of an environment in which a product is produced may represent, for example, temperature or humidity around the production device, a degree of deterioration (for example, the number of years of aging, or the number of times machining is performed) of the device, or vibration thereof.

As other aspects of the control system according to the aforementioned embodiments, an aspect of the invention may be an information processing method for realizing the aforementioned configurations, may be a program, or may be a storage medium which stores such a program and which is readable by a computer or the like. Here, a storage medium which is readable by a computer or the like is a medium which can store information such as programs through an electrical, magnetic, optical, mechanical, or chemical action. As other aspects of the control system according to the aforementioned embodiments, an aspect of the invention may be an information processing system that realizes some of the aforementioned configurations (for example, a part that constructs a prediction model, a part that determines the second threshold value, or a part that uses the prediction model and the second threshold value), may be an information processing device, may be a program, or may be a storage medium which stores such a program and which is readable by a computer or the like.

For example, a control method according to an aspect of the invention is an information processing method which is performed by a computer and which includes: a step of acquiring a plurality of learning data sets of which each includes a combination of first data associated with a factor determining an operation of a subject device and second data associated with a command value for the subject device which is adapted to the factor indicated by the first data; a step of constructing a prediction model that outputs a value corresponding to the second data when the first data is input for each of the acquired plurality of learning data sets; a step of estimating a possible numerical value range of the command value from a distribution of the second data in the acquired plurality of learning data sets; a step of determining a second threshold value for the command value for the subject device on the basis of the estimated numerical value range such that a first acceptable range which is defined by a first threshold value preset for the command value for the subject device is extended; a step of acquiring input data associated with the factor in an operational phase; a step of acquiring an output value from the prediction model by inputting the acquired input data to the prediction model; a step of determining the command value for the subject device within a second acceptable range which is defined by the determined second threshold value on the basis of the acquired output value; and a step of controlling the operation of the subject device on the basis of the determined command value.

For example, a learning device according to an aspect of the invention includes: a learning data acquiring unit configured to acquire a plurality of learning data sets of which each includes a combination of first data associated with a factor determining an operation of a subject device and second data associated with a command value for the subject device which is adapted to the factor indicated by the first data; a learning processing unit configured to construct a prediction model that outputs a value corresponding to the second data when the first data is input for each of the acquired plurality of learning data sets; an estimation unit configured to estimate a possible numerical value range of the command value from a distribution of the second data in the acquired plurality of learning data sets; and a threshold value determining unit configured to determine a second threshold value for the command value for the subject device on the basis of the estimated numerical value range such that a first acceptable range which is defined by a first threshold value preset for the command value for the subject device is extended.

For example, a control device according to an aspect of the invention includes: an input data acquiring unit configured to acquire input data associated with a factor determining an operation of a subject device; a prediction operation unit configured to acquire an output value from a prediction model by inputting the acquired input data to the prediction model and to determine a command value for the subject device within a second acceptable range which is defined by a second threshold value which is determined by the learning device according to claim 9 on the basis of the acquired output value; and an operation control unit configured to control the operation of the subject device on the basis of the determined command value.

For example, a learning method according to an aspect of the invention is an information processing method which is performed by a computer and which includes: a learning data acquiring step of acquiring a plurality of learning data sets of which each includes a combination of first data associated with a factor determining an operation of a subject device and second data associated with a command value for the subject device which is adapted to the factor indicated by the first data; a learning processing step of constructing a prediction model that outputs a value corresponding to the second data when the first data is input for each of the acquired plurality of learning data sets; an estimation step of estimating a possible numerical value range of the command value from a distribution of the second data in the acquired plurality of learning data sets; and a threshold value determining step of determining a second threshold value for the command value for the subject device on the basis of the estimated numerical value range such that a first acceptable range which is defined by a first threshold value preset for the command value for the subject device is extended.

For example, a learning program according to an aspect of the invention is a program causing a computer to perform: a learning data acquiring step of acquiring a plurality of learning data sets of which each includes a combination of first data associated with a factor determining an operation of a subject device and second data associated with a command value for the subject device which is adapted to the factor indicated by the first data; a learning processing step of constructing a prediction model that outputs a value corresponding to the second data when the first data is input for each of the acquired plurality of learning data sets; an estimation step of estimating a possible numerical value range of the command value from a distribution of the second data in the acquired plurality of learning data sets; and a threshold value determining step of determining a second threshold value for the command value for the subject device on the basis of the estimated numerical value range such that a first acceptable range which is defined by a first threshold value preset for the command value for the subject device is extended.

Advantageous Effects of Invention

According to the invention, it is possible to perform prediction control such that performance of a prediction model can be sufficiently exerted.

BRIEF DESCRIPTION OF THE DRAWINGS

FIG. 11A is a diagram schematically illustrating an example of a method of determining a second threshold value.

DESCRIPTION OF THE EMBODIMENTS

Hereinafter, embodiments of an aspect of the present invention (hereinafter also referred to as "this embodiment") will be described with reference to the accompanying drawings. The embodiments described below are merely examples of the invention in all respects. Various improvements or modifications can be added thereto without departing from the scope of the invention. That is, specific configurations of the embodiments may be appropriately employed for embodiments of the invention. Data which appears in this embodiment is described in natural language, but is more specifically described in pseudo language, commands, parameters, machine language, or the like which can be recognized by a computer.

1 Application Example

First, an example of a situation to which the invention is applied will be described below with reference to FIG. 1.

Figure 1:
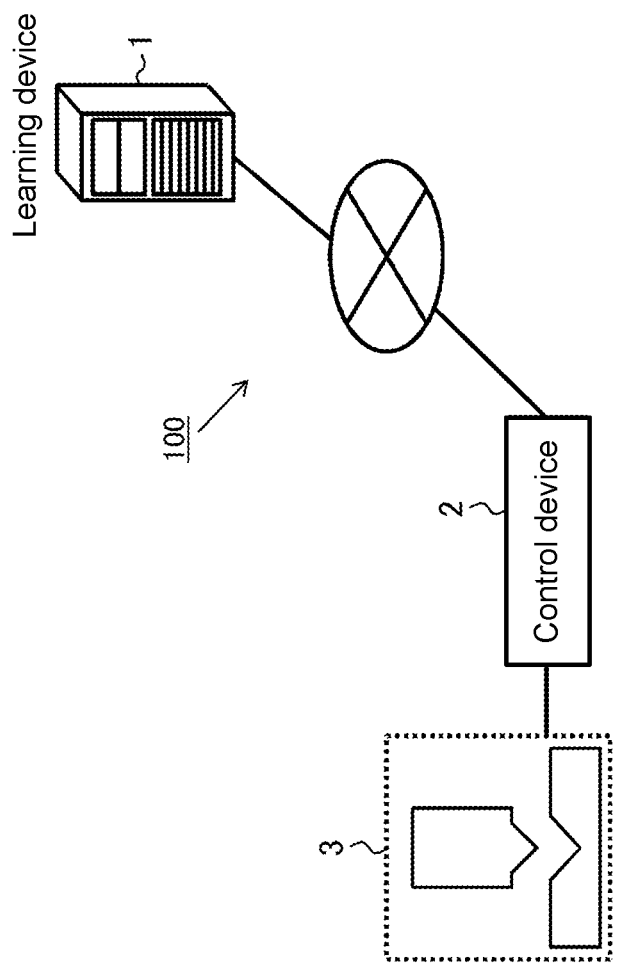
FIG. 1 is diagram schematically illustrating an example of a situation to which the present invention is applied.

FIG. 1 is diagram schematically illustrating an example of a situation in which a control system 100 according to this embodiment is used.

The control system 100 illustrated in FIG. 1 includes a learning device 1 and a control device 2 which are connected via a network and is configured to control an operation of a production device 3. The type of the network between the learning device 1 and the control device 2 may be appropriately selected, for example, from the Internet, a radio communication network, a mobile communication network, a phone network, and a dedicated network.

In the example illustrated in FIG. 1, the learning device 1 and the control device 2 are computers which are different from each other. However, the configuration of the control system 100 is not limited to the example. The learning device 1 and the control device 2 may be configured as a unified computer. Each of the learning device 1 and the control device 2 may be constituted by a plurality of computers.

The learning device 1 according to this embodiment is a computer configured to construct a prediction model (a prediction model 5 which will be described later) for predicting and controlling an operation of the production device 3. The production device 3 is configured to produce a product from a workpiece and is an example of a "subject device" in the claims. Here, the "subject device" in the claims is not limited to the production device 3, and may include all types of devices which are to be controlled. In the example illustrated in FIG. 1, the production device 3 is a press machine that machines a workpiece. The press machine is an example of a "production device." The production device to which the control device 2 can be applied is not limited to the press machine, and may be appropriately selected depending on embodiments. For example, in addition to the press machine, the production device 3 may be an injection molding machine, an NC lathe, an electric discharge machine, a packaging machine, a carrier machine, or a carrier mechanism in an inspection machine.

The learning device 1 according to this embodiment acquires a plurality of learning data sets (a learning data set 121 which will be described later) to construct a prediction model. Each of the plurality of learning data sets includes a combination of first data associated with a factor determining an operation of the production device 3 (a feature value 1211 and an attribute value 1212 which will be described later) and second data associated with a command value for the production device 3 which is adapted to the factor indicated by the first data (a correction value 1213 which will be described later). The learning device 1 constructs a prediction model that outputs a value corresponding to the second data when the first data is input thereto for each of the acquired plurality of learning data sets.

The learning device 1 according to this embodiment estimates a possible numerical value range of the command value from a distribution of the second data in the acquired plurality of learning data sets. Then, the learning device 1 determines a second threshold value for the command value for the production device 3 on the basis of the estimated numerical value range such that a first acceptable range which is defined by a first threshold value preset for the command value for the production device 3 is extended.

On the other hand, the control device 2 according to this embodiment is a computer configured to control the operation of the production device 3 using the prediction model constructed by the learning device 1. Specifically, the control device 2 according to this embodiment acquires input data associated with a factor determining the operation of the production device 3 (a feature value 71 and an attribute value 72 which will be described later). Subsequently, the control device 2 acquires an output value from the prediction model by inputting the acquired input data to the prediction model. Then, the control device 2 determines the command value for the production device 3 within a second acceptable range which is defined by the second threshold value determined by the learning device 1 on the basis of the acquired output value. Then, the control device 2 controls the operation of the production device 3 on the basis of the determined command value.

As described above, in the control system 100 according to this embodiment, the second acceptable range defined by the second threshold value set to extend the first acceptable range is used as a constraint condition for the command value instead of the first acceptable range defined by the preset first threshold value. Accordingly, even when the first acceptable range is set to be narrower due to excessive consideration of safety, it is possible to extend the acceptable range of the command value which is used for control of the operation of the production device 3. That is, some command values which are likely to be rejected when the first acceptable range is used as the constraint condition can be used for control of the operation of the production device 3.

The learning data sets are collected to realize control of operations suitable for specific cases. Accordingly, with the command value which is designated on the basis of the second data in each learning data set, it is possible to safely control the operation of the production device 3. Accordingly, on the basis of the numerical value range estimated from the distribution of the second data in the learning data sets, it is possible to determine the second threshold value defining the second acceptable range such that safety of the operation of the production device 3 is secured. Accordingly, with the control system 100 according to this embodiment, it is possible to perform prediction control in which performance of the prediction model can be sufficiently exerted while securing safety of the operation of the production device 3.

2 Configuration Example

[Hardware Configuration]
<Learning Device>

Figure 2:
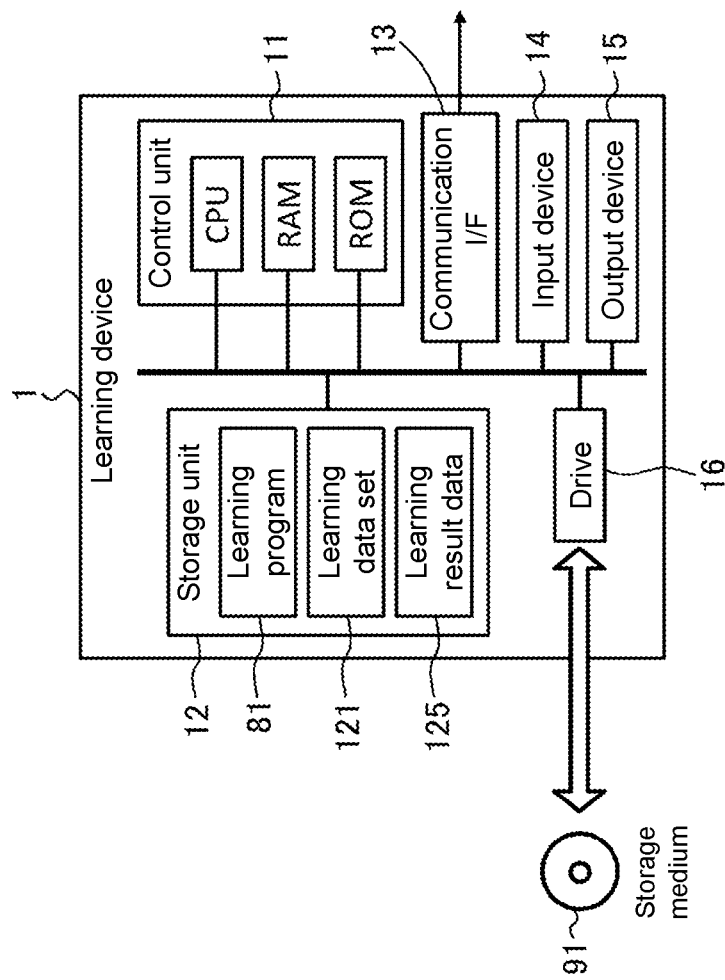
FIG. 2 is a diagram schematically illustrating an example of a hardware configuration of a learning device according to an embodiment.

An example of a hardware configuration of the learning device 1 according to this embodiment will be described below with reference to FIG. 2. FIG. 2 is a diagram schematically illustrating the hardware configuration of the learning device 1 according to this embodiment.

As illustrated in FIG. 2, the learning device 1 according to this embodiment is a computer in which a control unit 11, a storage unit 12, a communication interface 13, an input device 14, an output device 15, and a drive 16 are electrically connected to each other. In FIG. 2, the communication interface is illustrated as "COMMUNICATION I/F."

The control unit 11 includes a central processing unit (CPU) which is a hardware processor, a random access memory (RAM), and a read only memory (ROM) and is configured to perform information processing on the basis of programs and various types of data. The storage unit 12 is an example of a memory and is constituted, for example, by a hard disk drive or a solid state drive. In this embodiment, the storage unit 12 stores various types of information such as a learning program 81 which is executed by the control unit 11 (the CPU), a plurality of learning data sets 121, and learning result data 125.

The learning program 81 is a program that causes the learning device 1 to perform information processing (FIG. 9) which will be described later in machine learning for constructing a prediction model and that generates the learning result data 125 as a result of the machine learning. The learning program 81 includes a series of commands for the information processing. The plurality of learning data sets 121 are data which is used for the machine learning for constructing the prediction model capable of predicting a command value adapted to production of a product with the production device 3. Details thereof will be described later.

The communication interface 13 is, for example, a wired local area network (LAN) module or a wireless LAN module and is an interface that performs wired or wireless communication via a network. The learning device 1 can perform data communication with another information processing device (for example, the control device 2) via the network using the communication interface 13. The learning device 1 can transmit the generated learning result data 125 to an external device using the communication interface 13.

The input device 14 is a device for performing, for example, an input of a mouse or a keyboard. The output device 15 is a device that performs, for example, an output of a display or a speaker. An operator can operate the learning device 1 using the input device 14 and the output device 15.

The drive 16 is, for example, a CD drive or a DVD drive and is a drive device that reads a program stored in a storage medium 91. The type of the drive 16 may be appropriately selected depending on the type of the storage medium 91. At least one of the learning program 81 and the learning data sets 121 may be stored in the storage medium 91.

The storage medium 91 is a medium which can store information such as programs through an electrical, magnetic, optical, mechanical, or chemical action such that a computer, other units, a machine, or the like can read the information such as programs stored therein. The learning device 1 may acquire at least one of the learning program 81 and the learning data sets 121 from the storage medium 91.

In FIG. 2, a disk-type storage medium such as a CD or a DVD is illustrated as an example of the storage medium 91. However, the type of the storage medium 91 is not limited to the disk type and may be a type other than the disk type. For example, a semiconductor memory such as a flash memory can be used as the storage medium other than the disk type.

The specific hardware configuration of the learning device 1 can be appropriately subjected to omission, replacement, and addition of elements depending on embodiments. For example, the control unit 11 may include a plurality of hardware processors. Each hardware processor may be constituted by a microprocessor, a field-programmable gate array (FPGA), or the like. The storage unit 12 may be constituted by the RAM and the ROM included in the control unit 11. At least one of the communication interface 13, the input device 14, the output device 15, and the drive 16 may be omitted. The learning device 1 includes a plurality of information processing devices. In this case, the hardware configurations of the computers may be the same or may be different from each other. In addition to an information processing device which is designed to be used exclusively for services which are provided, a general-purpose server device, a general-purpose personal computer (PC), or the like may be used as the learning device 1.

<Control Device>

Figure 3:
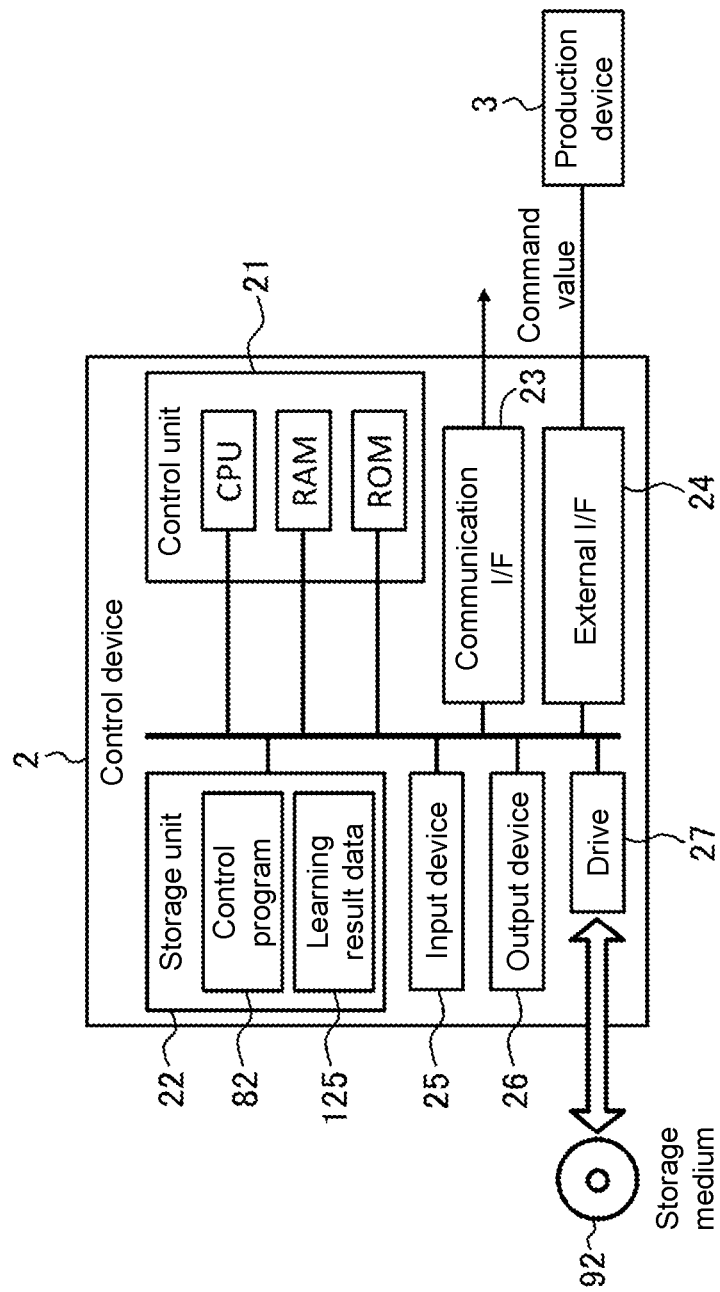
FIG. 3 is a diagram schematically illustrating an example of a hardware configuration of a control device according to an embodiment.

An example of a hardware configuration of the control device 2 according to this embodiment will be described below with reference to FIG. 3. FIG. 3 is a diagram schematically illustrating the hardware configuration of the control device 2 according to this embodiment.

As illustrated in FIG. 3, the control device 2 according to this embodiment is a computer in which a control unit 21, a storage unit 22, a communication interface 23, an external interface 24, an input device 25, an output device 26, and a drive 27 are electrically connected to each other. In FIG. 3, the communication interface and the external interface are illustrated as "COMMUNICATION I/F" and "EXTERNAL I/F."

Similar to the control unit 11, the control unit 21 includes, for example, a CPU which is a hardware processor, a RAM, and a ROM and is configured to perform information processing on the basis of programs and various types of data. The storage unit 22 is constituted, for example, by a hard disk drive or a solid state drive. The storage unit 22 stores various types of information such as a control program 82 which is executed by the control unit 21 (the CPU) and learning result data 125.

The control program 82 is a program that causes the control device 2 to perform information processing (FIG. 12) which will be described later for controlling the operation of the production device 3 and includes a series of commands for the information processing. The learning result data 125 is data for setting a learned prediction model. Details thereof will be described later.

The communication interface 23 is, for example, a wired LAN module or a wireless LAN module and is an interface that performs wired or wireless communication via a network. The control device 2 can perform data communication with another information processing device (for example, the learning device 1) via the network using the communication interface 23.

The external interface 24 is, for example, a Universal Serial Bus (USB) port or a dedicated port and is an interface for connection to an external device. The type and number of external interfaces 24 may be appropriately selected depending on the type and number of external devices which are connected thereto. In this embodiment, the control device 2 is connected to the production device 3 via the external interface 24. Accordingly, the control device 2 can control the operation of the production device 3 by transmitting a command value for the production device 3.

The input device 25 is a device for performing, for example, an input of a mouse or a keyboard. The output device 26 is a device that performs, for example, an output of a display or a speaker. An operator can operate the control device 2 using the input device 25 and the output device 26.

The drive 27 is, for example, a CD drive or a DVD drive and is a drive device that reads a program stored in a storage medium 92. The type of the drive 27 may be appropriately selected depending on the type of the storage medium 92. At least one of the control program 82 and the learning result data 125 may be stored in the storage medium 92.

The storage medium 92 is a medium which can store information such as programs through an electrical, magnetic, optical, mechanical, or chemical action such that a computer, other units, a machine, or the like can read the information such as programs stored therein. The control device 2 may acquire at least one of the control program 82 and the learning result data 125 from the storage medium 92.

In FIG. 3, similarly to FIG. 2, a disk-type storage medium such as a CD or a DVD is illustrated as an example of the storage medium 92. However, the type of the storage medium 92 is not limited to the disk type and may be a type other than the disk type. For example, a semiconductor memory such as a flash memory can be used as the storage medium other than the disk type.

The specific hardware configuration of the control device 2 can be appropriately subjected to omission, replacement, and addition of elements depending on embodiments. For example, the control unit 21 may include a plurality of hardware processors. Each hardware processors may be constituted, for example, by a microprocessor, an FPGA, or a DSP. The storage unit 22 may be constituted by the RAM and the ROM included in the control unit 21. At least one of the communication interface 23, the external interface 24, the input device 25, the output device 26, and the drive 27 may be omitted. The control device 2 includes a plurality of computers. In this case, the hardware configurations of the computers may be the same or may be different from each other. In addition to an information processing device which is designed to be used exclusively for services which are provided, a general-purpose controller, a general-purpose server device, a general-purpose desktop PC, a general-purpose notebook PC, a tablet PC, or the like may be used as the control device 2.

<Production Device>

Figure 4:
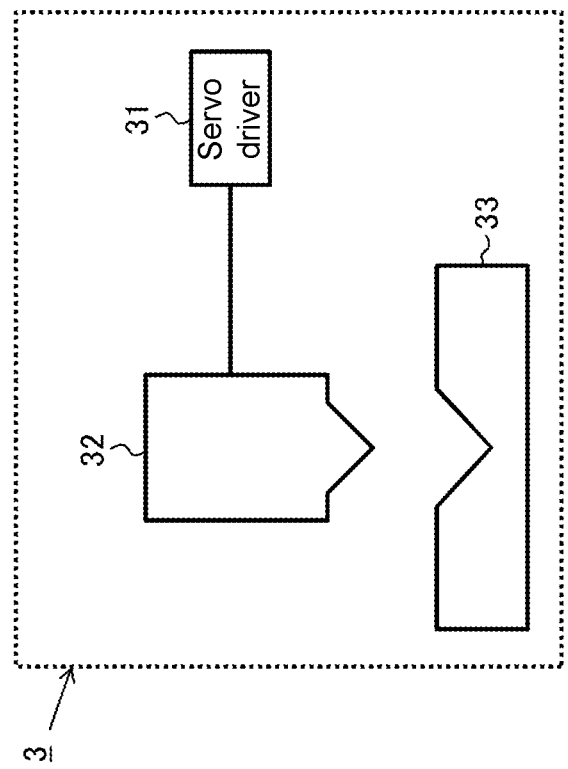
FIG. 4 is a diagram schematically illustrating an example of a production device according to an embodiment.

An example of a hardware configuration of the production device 3 according to this embodiment will be described below with reference to FIG. 4. FIG. 4 is a diagram schematically illustrating an example of the hardware configuration of the production device 3 according to this embodiment.

The production device 3 according to this embodiment includes a servo driver 31, an upper mold 32, and a lower mold 33. The lower mold 33 is fixed, and the upper mold 32 is configured to be movable in the vertical direction using a servo motor (not illustrated). Accordingly, the upper mold 32 can press a workpiece to the lower mold 33 to shape the workpiece or can be separated from the lower mold 33. The servo driver 31 is configured to drive the servo motor of the upper mold 32 on the basis of a command value from the control device 2.

Figure 5A:
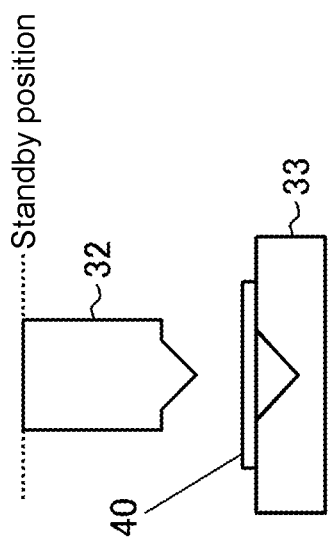
FIG. 5A is a diagram schematically illustrating an example of a production process routine in the production device illustrated in FIG. 4.

An example of a production process flow which is performed by the production device 3 will be described below with reference to FIGS. 5A to 5D. The production device 3 is disposed, for example, in a production line. As illustrated in FIG. 5A, in an initial state, the upper mold 32 is disposed at a standby position which is separated from the lower mold 33, and waits until a workpiece 40 is carried to the lower mold 33. The workpiece 40 is, for example, a metallic plate. The workpiece 40 is not limited to such an example and may be appropriately selected depending on the type of the production device 3. The workpiece 40 may be, for example, a raw material of a product, an object before being machined, or a part before being assembled.

Figure 5B:
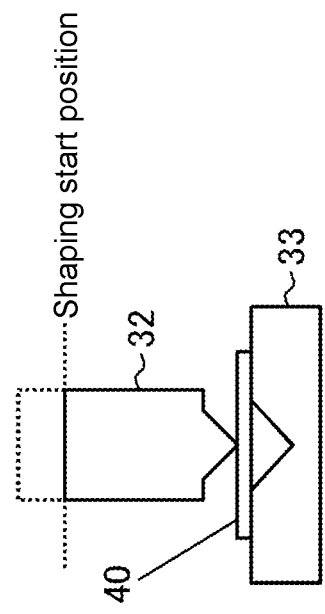
FIG. 5B is a diagram schematically illustrating an example of a production process routine in the production device illustrated in FIG. 4.

After the workpiece 40 has been disposed at a predetermined position of the lower mold 33, the production device 3 drives the servo motor of the upper mold 32 using the servo driver 31 to dispose the upper mold 32 at a shaping start position as illustrated in FIG. 5B. The shaping start position is, for example, a position at which a tip of the upper mold 32 comes into contact with the workpiece 40 or a position immediately before.

Figure 5C:
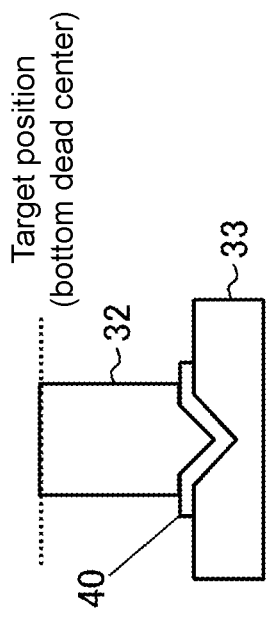
FIG. 5C is a diagram schematically illustrating an example of a production process routine in the production device illustrated in FIG. 4.

Then, as illustrated in FIG. 5C, the production device 3 further drives the servo motor of the upper mold 32 using the servo driver 31 to move the upper mold 32 to a target position (a bottom dead center), and shapes the workpiece 40 using the upper mold 32 and the lower mold 33. Accordingly, the production device 3 can produce a product 41 from the workpiece 40. The product 41 is not particularly limited as long as it can be obtained by causing the production device 3 to perform a production process on the workpiece 40, and may be a final product or an intermediate product (a product under machining).

Figure 5D:
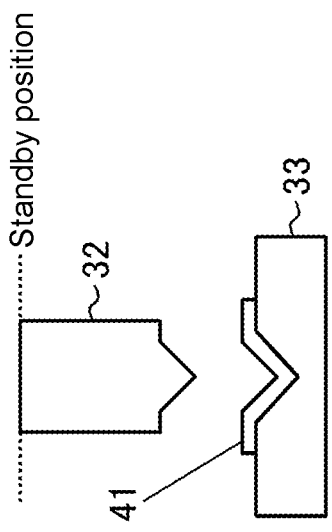
FIG. 5D is a diagram schematically illustrating an example of a production process routine in the production device illustrated in FIG. 4.

After the shaping has been completed, the production device 3 drives the servo motor of the upper mold 32 using the servo driver 31 to move the upper mold 32 to the standby position as illustrated in FIG. 5D. Then, the product 41 which is obtained by shaping the workpiece 40 is carried from the production device 3 using a belt conveyor (not illustrated) or the like. Accordingly, a series of production processes of producing the product 41 from the workpiece 40 is completed.

In these production processes, when a pressing time in FIG. 5C is not sufficient or the servo motor is not driven until the upper mold 32 reaches the bottom dead center, the quality of the resultant product 41 deteriorates. Therefore, in the related art, an operator on the site curbs occurrence of a defective product by periodically checking the quality of products and adjusting settings of the operation of the production device. On the other hand, the control device 2 according to this embodiment predicts an appropriate command value for the production device 3 such that no failure occurs in the production processes using a prediction model. Accordingly, the control device 2 automatically adjusts the operation of the production device 3 such that occurrence of a defective product is curbed.

[Software Configuration]

<Learning Device>

Figure 6:
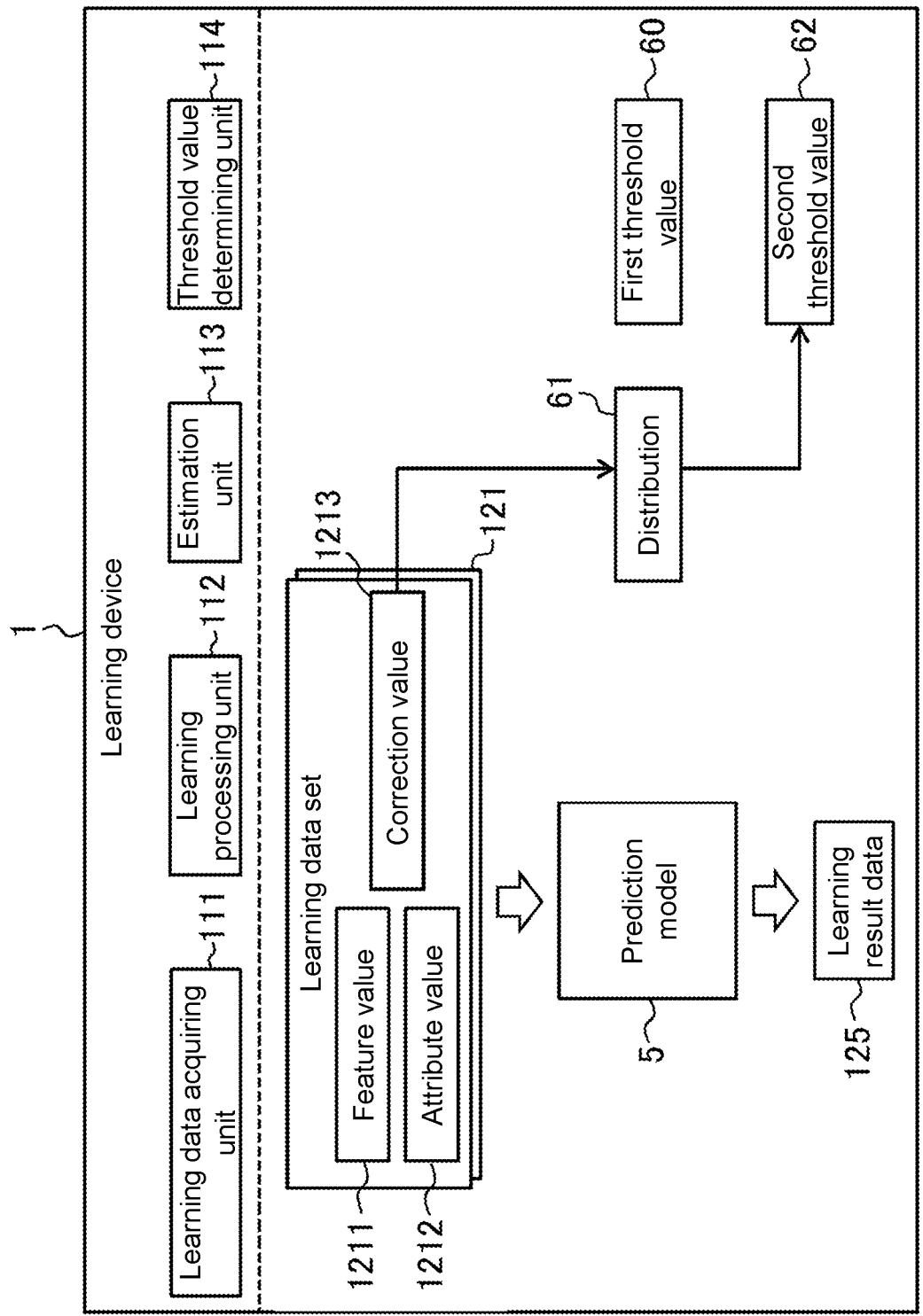
FIG. 6 is a diagram schematically illustrating an example of a software configuration of the learning device according to the embodiment.

An example of a software configuration of the learning device 1 according to this embodiment will be described below with reference to FIG. 6. FIG. 6 is a diagram schematically illustrating an example of the software configuration of the learning device 1 according to this embodiment.

The control unit 11 of the learning device 1 loads the learning program 81 stored in the storage unit 12 to the RAM. Then, the control unit 11 analyzes and executes the learning program 81 loaded to the RAM using the CPU, and controls the elements on the basis of a series of commands included in the learning program 81. Accordingly, as illustrated in FIG. 6, the learning device 1 according to this embodiment serves as a computer including a learning data acquiring unit 111, a learning processing unit 112, an estimation unit 113, and a threshold value determining unit 114 as software modules. That is, in this embodiment, the software modules are realized by the control unit 11 (CPU).

The learning data acquiring unit 111 acquires a plurality of learning data sets 121 which is used for machine learning of the prediction model 5. Each learning data set 121 includes a combination of first data associated with a factor determining the operation of the production device 3 and second data associated with a command value for the production device 3 which is adapted to the factor indicated by the first data. Specifically, in this embodiment, the first data includes a feature value 1211 of a workpiece 40 and an attribute value 1212 of an environment in which a product 41 is produced. The second data includes a correction value 1213 for a reference value of the command value, the correction value 1213 being determined to acquire a command value adapted to a situation indicated by the feature value 1211 and the attribute value 1212. The first data corresponds to training data (input data) and the second data corresponds to supervised data (correction answer data).

The learning processing unit 112 constructs a learned prediction model 5 by performing machine learning using the acquired plurality of learning data sets 121. That is, the learning processing unit 112 constructs the prediction model 5 that outputs a value corresponding to the second data (the correction value 1213) correlated with the input first data when the first data (the feature value 1211 and the attribute value 1212) is input thereto for each of the acquired learning data sets 121. Then, the learning processing unit 112 stores information on the constructed learned prediction model 5 as the learning result data 125 in the storage unit 12.

The estimation unit 113 estimates a possible numerical value range of a command value from a distribution 61 of the second data (the correction value 1213) in the acquired learning data sets 121. Then, the threshold value determining unit 114 determines the second threshold value 62 for the command value for the production device 3 on the basis of the estimated numerical value range such that the first acceptable range defined by the first threshold value 60 preset for the command value for the production device 3 is extended.

Figure 7A:
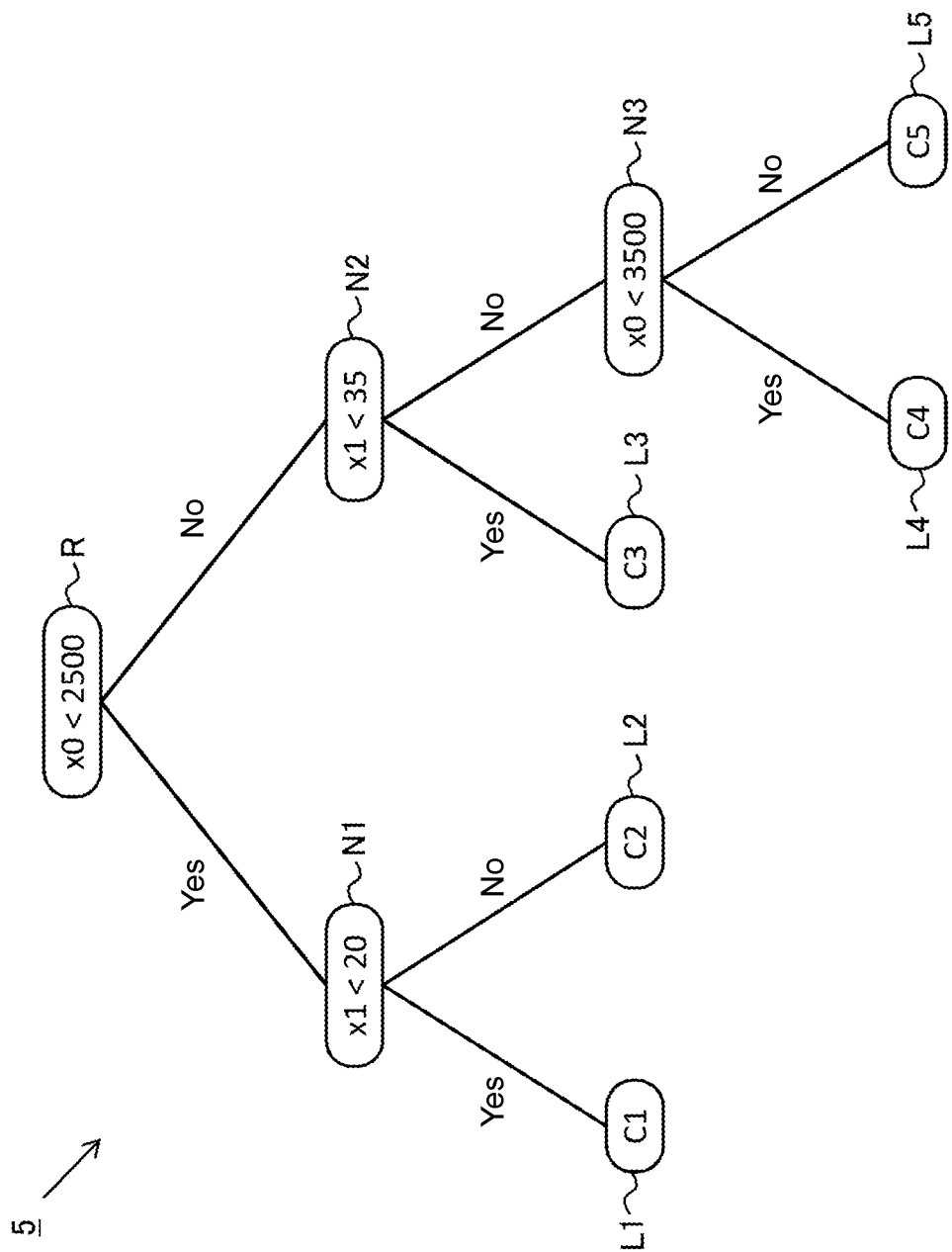
FIG. 7A is a diagram schematically illustrating an example of a prediction model according to an embodiment.
Figure 7B:
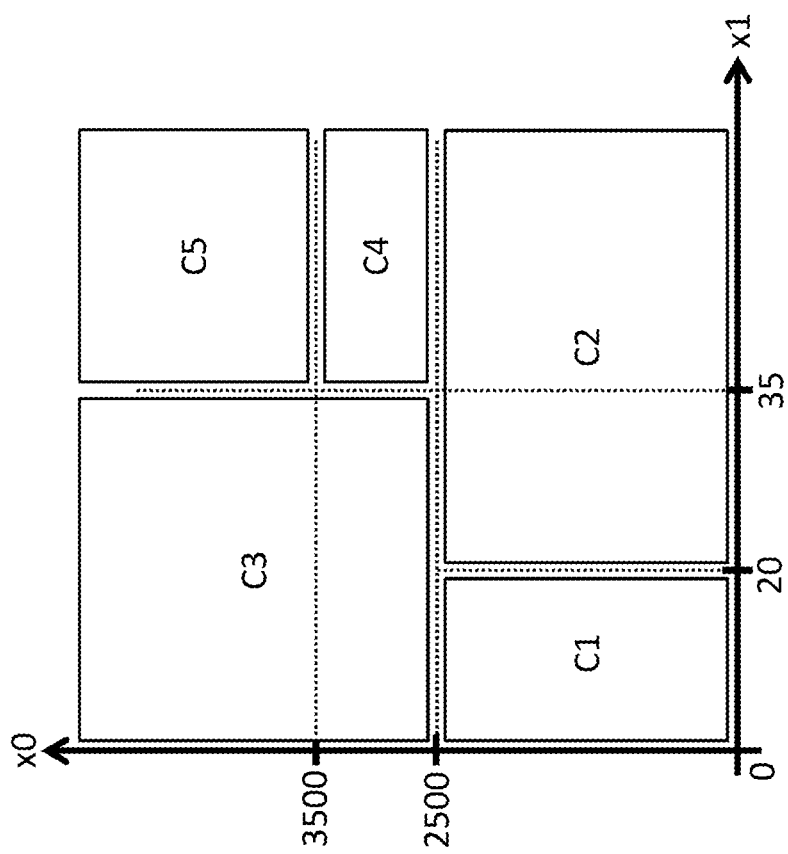
FIG. 7B is a diagram schematically illustrating a relationship between an input and an output of a prediction model.

(Prediction model) A prediction model 5 according to this embodiment will be described below further using FIGS. 7A and 7B. FIG. 7A is a diagram schematically illustrating an example of a configuration of a prediction model 5 according to this embodiment. FIG. 7B is a diagram schematically illustrating a relationship between an input and an output of the prediction model 5.

As illustrated in FIG. 7A, the prediction model 5 according to this embodiment is constituted by a decision tree (specifically, a regression tree). The prediction model 5 (the decision tree) includes a root node R, leaf nodes L1 to L5, and intermediate nodes N1 to N3 which are disposed between the root node R and the leaf nodes L1 to L5. A link is provided between the nodes. In the example illustrated in FIG. 7A, links are provided between the root node R and the intermediate nodes (N1 and N2), between the intermediate node N1 and the leaf nodes (L1 and L2), between the intermediate node N2 and the leaf node L3 and the intermediate node N3, and between the intermediate node N3 and the leaf nodes (L4 and L5).

In the example illustrated in FIG. 7A, the depth of the decision tree is 4, the number of intermediate nodes is 3, and the number of leaf nodes is 5. However, the depth of the decision tree, the number of intermediate nodes, and the number of leaf nodes are not limited to the example, and may be appropriately determined depending on embodiments. In the example illustrated in FIG. 7A, no link is provided between the root node R and the leaf nodes L1 to L5. However, the configuration of the decision tree is not limited to the example, and there may be a leaf node which is connected to a link from the root node.

An operational process of the prediction model 5 is a search process of tracing the links from the root node R to the leaf nodes L1 to L5 in the decision tree. That is, paths from the root node R to the leaf nodes L1 to L5 (the root node R and the intermediate nodes N1 to N3 in the example of FIG. 7A) are correlated with branching conditions. In the example illustrated in FIG. 7A, a branching condition "x0<2500" is correlated with the root node R, a branching condition "x1<20" is correlated with the intermediate node N1, a branching condition "x1<35" is correlated with the intermediate node N2, and a branching condition "x0<3500" is correlated with the intermediate node N3. On the other hand, final results (classes C1 to C5) of the operational process of the prediction model 5 are correlated with the leaf nodes L1 to L5 as illustrated in FIG. 7B.

In this embodiment, a correction value based on a feature value and an attribute value which are input is correlated with the leaf nodes L1 to L5 (classes C1 to C5). That is, when the feature value 1211 and the attribute value 1212 are input, the learning processing unit 112 constructs the prediction model 5 (the decision tree) such that the leaf node of the class corresponding to the correction value 1213 correlated with the input feature value 1211 and the input attribute value 1212 is reached. Then, the learning processing unit 112 stores information indicating the configuration of the constructed learned prediction model 5 and the branching conditions and the like as the learning result data 125 in the storage unit 12.

<Control Device>

Figure 8:
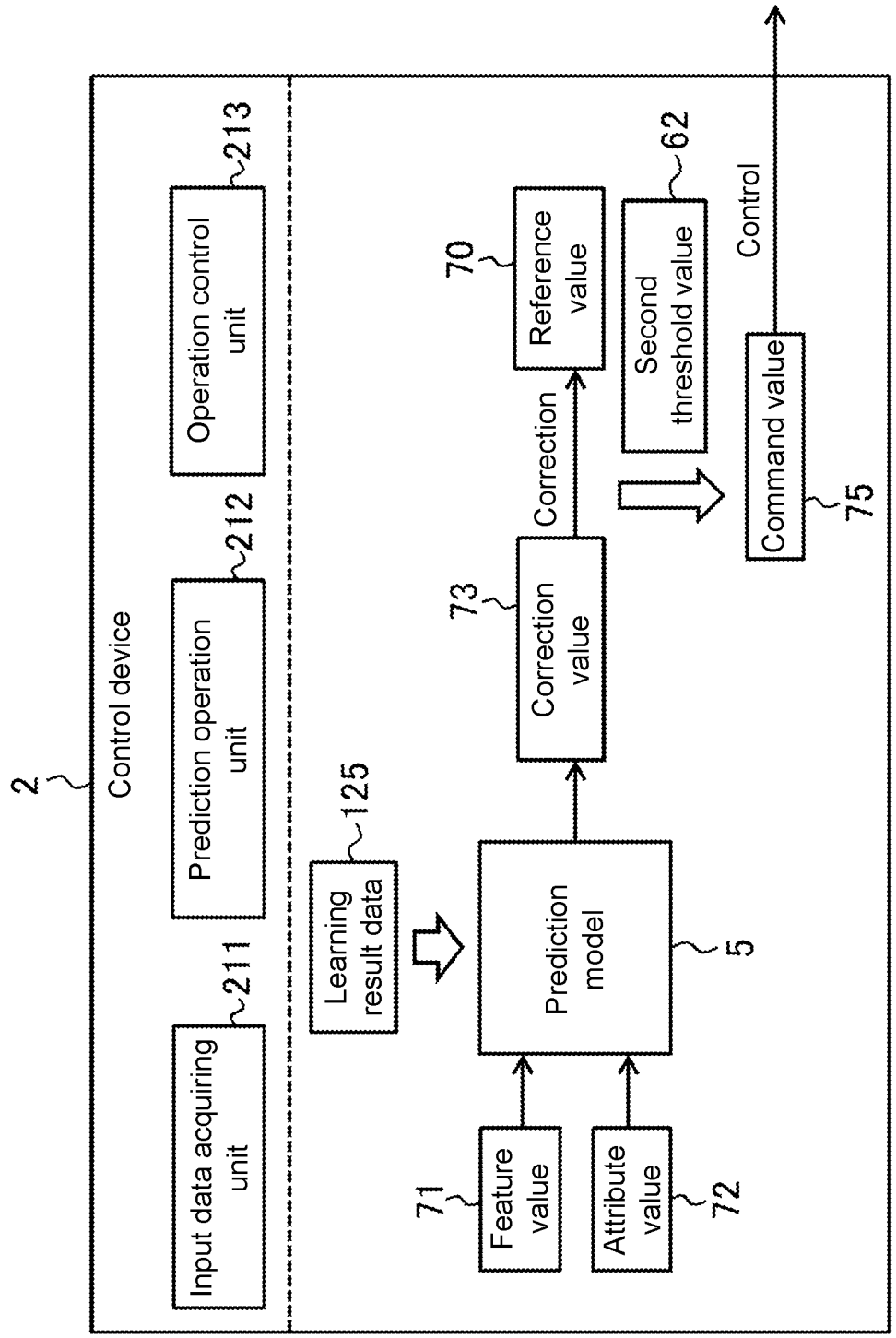
FIG. 8 is a diagram schematically illustrating an example of a software configuration of the control device according to the embodiment.

An example of a software configuration of the control device 2 according to this embodiment will be described below with reference to FIG. 8. FIG. 8 is a diagram schematically illustrating an example of the software configuration of the control device 2 according to this embodiment.

The control unit 21 of the control device 2 loads the control program 82 stored in the storage unit 22 to the RAM. Then, the control unit 21 analyzes and executes the control program 82 loaded to the RAM using the CPU, and controls the elements on the basis of a series of commands included in the control program 82. Accordingly, as illustrated in FIG. 8, the control device 2 according to this embodiment serves as a computer including an input data acquiring unit 211, a prediction operation unit 212, and an operation control unit 213 as software modules. That is, in this embodiment, the software modules are realized by the control unit 21 (CPU).

The input data acquiring unit 211 acquires input data associated with a factor determining the operation of the production device 3. In this embodiment, the prediction model 5 is constructed to predict a command value which is adapted to production of a product 41 in response to an input of a feature value of a workpiece 40 and an attribute value of an environment in which a product 41 is produced. Therefore, the input data acquiring unit 211 acquires a feature value 71 of a workpiece 40 and an attribute value 72 of an environment in which a product 41 is produced as input data.

The prediction operation unit 212 stores the learning result data 125 which is generated by the learning device 1. Accordingly, the prediction operation unit 212 includes the prediction model 5 which is constructed to predict a command value for a production device 3 that produces a product 41 from a workpiece 40, the command value being adapted to production of a product 41 using the production device 3. The prediction operation unit 212 sets the prediction model 5 which is used for prediction control with reference to the learning result data 125.

Then, the prediction operation unit 212 inputs the acquired input data (the feature value 71 and the attribute value 72) to the prediction model 5, and performs an operational process of the prediction model 5. Accordingly, the prediction operation unit 212 acquires an output value corresponding to the prediction result of the command value adapted to production of the product 41 using the production device 3 from the prediction model 5. The prediction operation unit 212 determines the command value for the production device 3 within the second acceptable range defined by the second threshold value 62 determined by the learning device 1 on the basis of the acquired output value.

In this embodiment, the prediction model 5 is constituted by a decision tree that outputs a correction value 73 for a reference value 70 of the command value as the output value corresponding to the prediction result of the command value adapted to production of the product 41. Accordingly, the prediction operation unit 212 performs a search process of the decision tree as the operational process of the prediction model 5. The prediction operation unit 212 can acquire the output value corresponding to the correction value 73 from the prediction model 5 by completing the operational process of the prediction model 5.

A search process of the decision tree (the prediction model 5) illustrated in FIG. 7A will be described below as a specific example. The prediction operation unit 212 starts the search process from the root node R of the prediction model 5 and performs search of deeper nodes until one of the leaf node L1 to L5 is reached by repeatedly determining whether the input data satisfies the branching condition. In the example illustrated in FIG. 7A, an input x0 corresponds to the feature value 71, and an input x1 corresponds to the attribute value 72. FIG. 7B illustrates a relationship between the inputs (x0 and x1) and the classes C1 to C5 correlated with the reached leaf nodes L1 to L5.

For example, it is assumed that the input x0 is 2000 and the input x1 is 30. In this case, the prediction operation unit 212 determines whether the input x0 satisfies the branching condition set for the root node R as an operational process (a search process) in a first stage of the prediction model 5. In the example illustrated in FIG. 7A, since the branching condition set for the root node R is "x0<2500" and the input x0 is 2000, the prediction operation unit 212 determines that the input x0 satisfies the branching condition set for the root node R, and searches for the intermediate node N1 in a next stage.

Then, the prediction operation unit 212 determines whether the input x1 satisfies the branching condition set for the intermediate node N1 as an operational process in a second stage of the prediction model 5. In the example illustrated in FIG. 7A, since the branching condition set for the intermediate node N1 is "x1<20" and the input x1 is 30, the prediction operation unit 212 determines that the input x1 does not satisfy the branching condition set for the intermediate node N1, and searches for the leaf node L2 in a next stage. As a result, since the search process of the decision tree reaches the leaf node L2, the operational process of the prediction model 5 is completed. The prediction operation unit 212 can acquire a correction value 73 correlated with the class C2 of the leaf node L2 as the final result of the operational process of the prediction model 5.

The method of acquiring the correction value 73 correlated with the classes C1 to C5 may be appropriately determined depending on embodiments. For example, correction values may be directly correlated with the classes C1 to C5. For example, the control device 2 may store reference information in a format such as a table indicating the correlation between the classes C1 to C5 and the correction values in the storage unit 22. The reference information may be generated in the process of learning the prediction model 5 or may be included in the learning result data 125. In this case, the prediction operation unit 212 can acquire the correction value 73 for the reference value 70 of the command value as the final result of the operational process of the prediction model 5 by comparing the class of one reached leaf node with the reference information after the leaf node has been reached.

Subsequently, the prediction operation unit 212 determines the command value 75 within the second acceptable range on the basis of a value which is acquired by correcting the reference value 70 using the acquired correction value 73. When the value acquired by correcting the reference value 70 using the correction value 73 is within the second acceptable range, the prediction operation unit 212 determines the acquired value as the command value 75. On the other hand, when the value acquired by correcting the reference value 70 using the correction value 73 is out of the second acceptable range, the prediction operation unit 212 determines the command value 75 within the second acceptable range by correcting the acquired value. Then, the operation control unit 213 controls the operation of the production device 3 on the basis of the determined command value 75.

<Other>

The software modules of the learning device 1 and the control device 2 will be described in detail in an operation example which will be described later. In this embodiment, all the software modules of the learning device 1 and the control device 2 are realized by general-purpose CPUs. However, some or all of the software modules may be realized by one or more dedicated processors. The software configurations of the learning device 1 and the control device 2 may be appropriately subjected to omission, replacement, and addition of software modules depending on embodiments.

3 Operation Example

[Learning Device]

Figure 9:
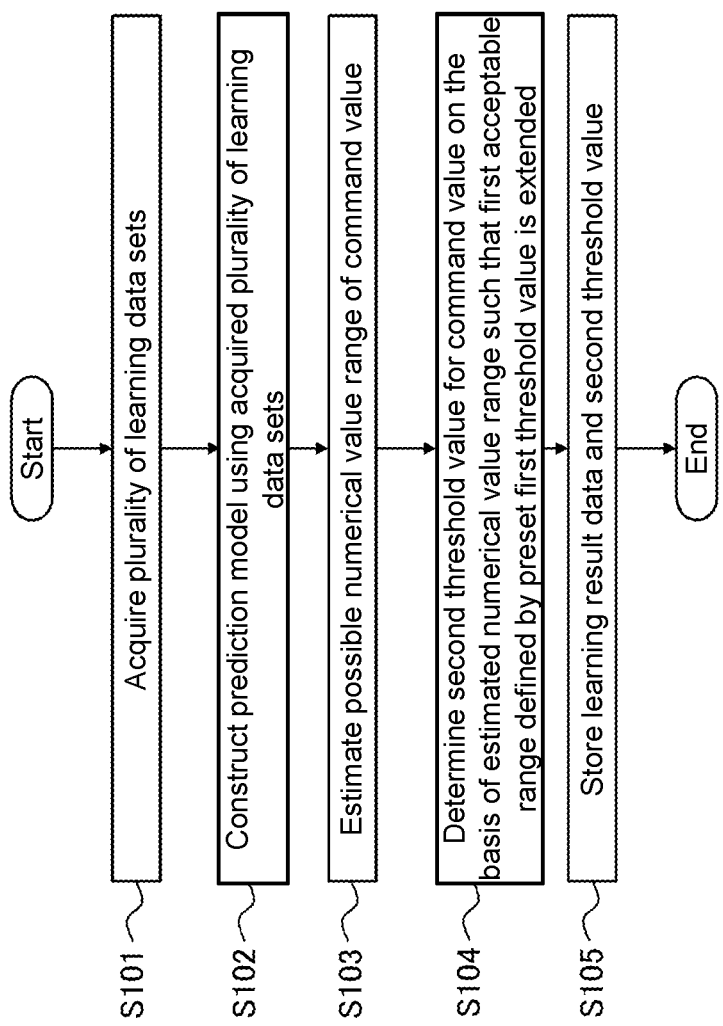
FIG. 9 is a diagram illustrating an example of a process routine which is performed by the learning device according to the embodiment.

An operation example of the learning device 1 will be described below with reference to FIG. 9. FIG. 9 is a flowchart illustrating an example of a process routine which is performed by the learning device 1. The process routine which will be described below is an example of a "learning method" in the claims. The process routine which will be described below is merely an example and the individual processes may be modified as much as possible. The process routine which will be described below can be appropriately subjected to omission, replacement, and addition of steps depending on embodiments.

(Step S101)

In Step S101, the control unit 11 serves as the learning data acquiring unit 111 and acquires a plurality of learning data sets 121 which is used for machine learning of the prediction model 5. Each learning data set 121 includes a combination of first data associated with a factor determining the operation of the production device 3 and second data associated with a command value for the production device 3 which is adapted to the factor indicated by the first data.

The configurations of the first data and the second data may be appropriately determined depending on embodiments as long as they can be used for machine learning of a prediction model (the prediction model 5 in this embodiment) for predicting and controlling the operation of a subject device. As described above, in this embodiment, the first data includes a feature value 1211 of a workpiece 40 and an attribute value 1212 of an environment in which a product 41 is produced. The second data includes a correction value 1213 for a reference value of a command value, the correction value 1213 being determined to acquire a command value adapted to a situation indicated by the feature value 1211 and the attribute value 1212.

The feature value 1211 of a workpiece 40 is not particularly limited as long as it can represent a certain feature of the workpiece 40, and may be appropriately selected depending on embodiments. The attribute value 1212 of an environment in which a product 41 is produced is not particularly limited as long it can represent a certain attribute of the environment in which the production device 3 operates, and may be appropriately selected depending on embodiments.

In this embodiment, the production device 3 is a press machine. As described above, with the production device 3, when a pressing time is not sufficient or the servo motor is not driven until the upper mold 32 reaches the bottom dead center, the quality of the resultant product 41 deteriorates. Accordingly, the feature value 1211 of a workpiece 40 and the attribute value 1212 of the environment in which a product 41 is produced are preferably associated with a press molding process in the production device 3.

Therefore, for example, an index indicating hardness, size, material, weight, or heat may be selected as the feature value 1211 of a workpiece 40. For example, temperature or humidity around the production device 3, an index indicating a degree of deterioration (for example, the number of years of aging, or the number of times machining is performed) of the device, or vibration thereof may be selected as the attribute value 1212 of the environment in which a product 41 is produced. At this time, the feature value 1211 of a workpiece 40 may directly represent a feature of the workpiece 40 or may indirectly represent a feature of the workpiece 40. Directly representing a feature of the workpiece 40 includes, for example, expressing hardness (a hardness level) of the workpiece 40 in a numerical value, a class, or the like. On the other hand, indirectly representing a feature of the workpiece 40 includes, for example, expressing a secondary index obtained at the time of measurement of hardness (a hardness level) of the workpiece 40 (for example, a load applied to the workpiece or a torque applied at the time of measurement) in a numerical value, a class, or the like. The same is true of the attribute value 1212.

Each learning data set 121 may be appropriately generated depending on embodiments. For example, the production device 3 is activated to acquire the feature value 1211 of a workpiece 40 and the attribute value 1212 of the environment in which a product 41 is produced in various conditions. Known sensors may be used to acquire the feature value 1211 and the attribute value 1212. For example, when the hardness of a workpiece 40 is acquired as the feature value 1211, a hardness meter may be used. When the temperature is acquired as the attribute value 1212, a temperature sensor may be used. A correction value 1213 for acquiring an appropriate command value in the conditions is combined into the acquired feature value 1211 and the acquired attribute value 1212. Accordingly, it is possible to generate each learning data set 121.

Generation of each learning data set 121 may be performed by the learning device 1. In this case, the control unit 11 may generate each learning data set 121 according to an operator's operation of the input device 14. The control unit 11 may automatically generate each learning data set 121 through execution of the learning program 81. By performing this generation process, the control unit 11 can acquire a plurality of learning data sets 121 in Step S101.

Generation of each learning data set 121 may be performed by an information processing device other than the learning device 1. In the information processing device, each learning data set 121 may be manually generated by an operator or may be automatically generated through execution of a program. In this case, in Step S101, the control unit 11 can acquire a plurality of learning data sets 121 which is generated by the other information processing device via the network, the storage medium 91, or the like.

The number of learning data sets 121 which are acquired in Step S101 may be appropriately determined depending on embodiments or may be appropriately determined, for example, such that machine learning of the decision tree can be performed. Accordingly, when a plurality of learning data sets 121 is acquired, the control unit 11 causes the process routine to progress to Step S102.

(Step S102)

In Step S102, the control unit 11 serves as the learning processing unit 112, and constructs a learned prediction model 5 by performing machine learning using the acquired learning data sets 121.

In this embodiment, the control unit 11 constructs the prediction model 5 that outputs a value corresponding to the correction value 1213 correlated with an input feature value 1211 and an input attribute value 1212 when the feature value 1211 and the attribute value 1212 are input thereto for each of the acquired learning data sets 121. More specifically, the control unit 11 constructs a decision tree in which search starting from a root node and reaching a leaf node of a class corresponding to the correlated correction value 1213 is possible on the basis of the feature value 1211 and the attribute value 1212. A concept learning system (CLS), an iterative dichotomizer 3 (ID3), C4.5, or the like may be used as the method of learning the decision tree. Accordingly, the control unit 11 can construct the learned prediction model 5. When the learned prediction model 5 is constructed, the control unit 11 causes the process routine to progress to Step S103.

(Steps S103 and S104)

In Step S103, the control unit 11 serves as the estimation unit 113 and estimates a possible numerical value range of the command value from the distribution 61 of the second data in the acquired learning data sets 121. In Step S104, the control unit 11 serves as the threshold value determining unit 114 and determines the second threshold value 62 for the command value for the production device 3 on the basis of the estimated numerical value range such that the first acceptable range defined by the first threshold value 60 preset for the command value for the production device 3 is extended.

(A) Expression Form

The expression forms of the estimated possible numerical value range of the command value, the first threshold value 60, and the second threshold value 62 are not particularly limited and may be appropriately determined depending on embodiments. In this embodiment, the second data includes the correction value 1213. Accordingly, in Step S103, the control unit 11 may indirectly estimate the possible numerical value range of the command value by estimating the possible numerical value range of the correction value 1213. Accordingly, the first threshold value 60 and the second threshold value 62 may be set for the correction value, whereby the acceptable range of the command value may be indirectly defined. The control unit 11 may directly estimate the possible numerical value range of the command value on the basis of the value acquired by correcting the reference value 70 using the correction value 1213. Accordingly, the first threshold value 60 and the second threshold value 62 may be set for the command value, whereby the acceptable range of the command value may be directly set. This is true of any case. In the following description, for the purpose of convenience of explanation, it is assumed that the possible numerical value range of the command value is directly estimated and the first threshold value 60 and the second threshold value 62 are directly set for the command value.

(B) Method of Estimating Numerical Value Range

The method of estimating the possible numerical value range of the command value from the distribution of the second data in Step S103 will be described below. The control unit 11 can ascertain a distribution of command values which are designated by the correction value 1213 (the second data) with reference to the correction value 1213 (the second data) in the learning data sets 121. At this time, the control unit 11 may approximate the distribution of command values using statistical schemes such as a normal distribution, a gamma distribution, and an exponential distribution.

Figure 10:
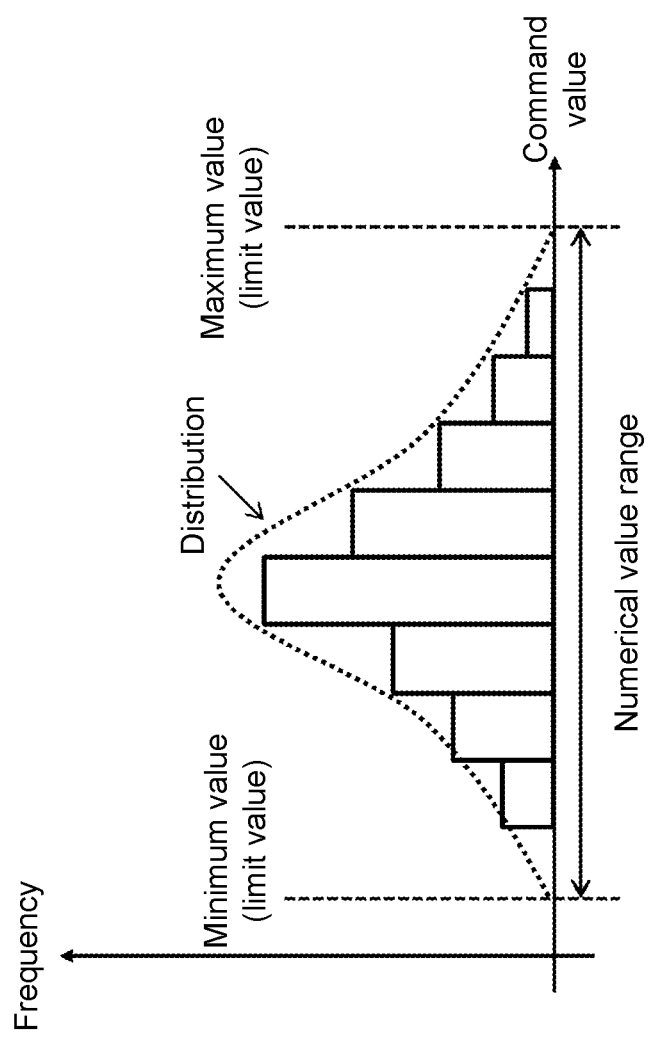
FIG. 10 is a diagram schematically illustrating an example of a distribution of second data associated with a command value.

FIG. 10 is a diagram illustrating an example of approximation of the distribution of command values to a normal distribution. Known statistical processes may be used for the method of approximating the distribution of command values to a normal distribution. In this case, the control unit 11 can calculate a minimum value and a maximum value of the command value on the basis of the approximated normal distribution. In Step S103, the control unit 11 may estimate a numerical value range from the minimum value to the maximum value as the possible numerical value range of the command value. The minimum value and the maximum value of the command value in the normal distribution are examples of limit values of the possible numerical value range of the command value.

The method of estimating the possible numerical value range of the command value is not limited to such statistical methods. In another method, for example, the control unit 11 may use a distribution ascertained by referring to the correction value 1213 (the second data) in each learning data set 121 as the possible numerical value range of the command value without any change. In this case, the minimum value and the maximum value of the command value which is designated by the correction value 1213 (the second data) in each learning data set 121 are the limit values of the possible numerical value range of the command value. The control unit 11 may estimate the numerical value range from the minimum value to the maximum value as the possible numerical value range of the command value.

(C) Method of determining second threshold value. The method of determining the second threshold value 62 on the basis of the estimated numerical value range in Step S104 will be described below. The method of deriving the second threshold value 62 from the numerical value range estimated in Step S103 may be appropriately set depending on embodiments. For example, the control unit 11 can determine the second threshold value 62 using the limit values of the numerical value range. For example, the control unit 11 may employ the limit values of the estimated numerical value range or a value between the first threshold value 60 and the limit values as the second threshold value 62.

The acceptable range of the command value can be defined by designating at least one of the lower limit value and the upper limit value. The first threshold value 60 may be the lower limit value of the first acceptable range or may be the upper limit value of the first acceptable range. When the first acceptable range is defined by both the lower limit value and the upper limit value, the lower limit value and the upper limit value of the first acceptable range may be handled as the first threshold value 60. In the example illustrated in FIGS. 11A and 11B, for the purpose of convenience of explanation, it is assumed that the lower limit value and the upper limit value of the first acceptable range are handled as the first threshold value 60.

Figure 11B:
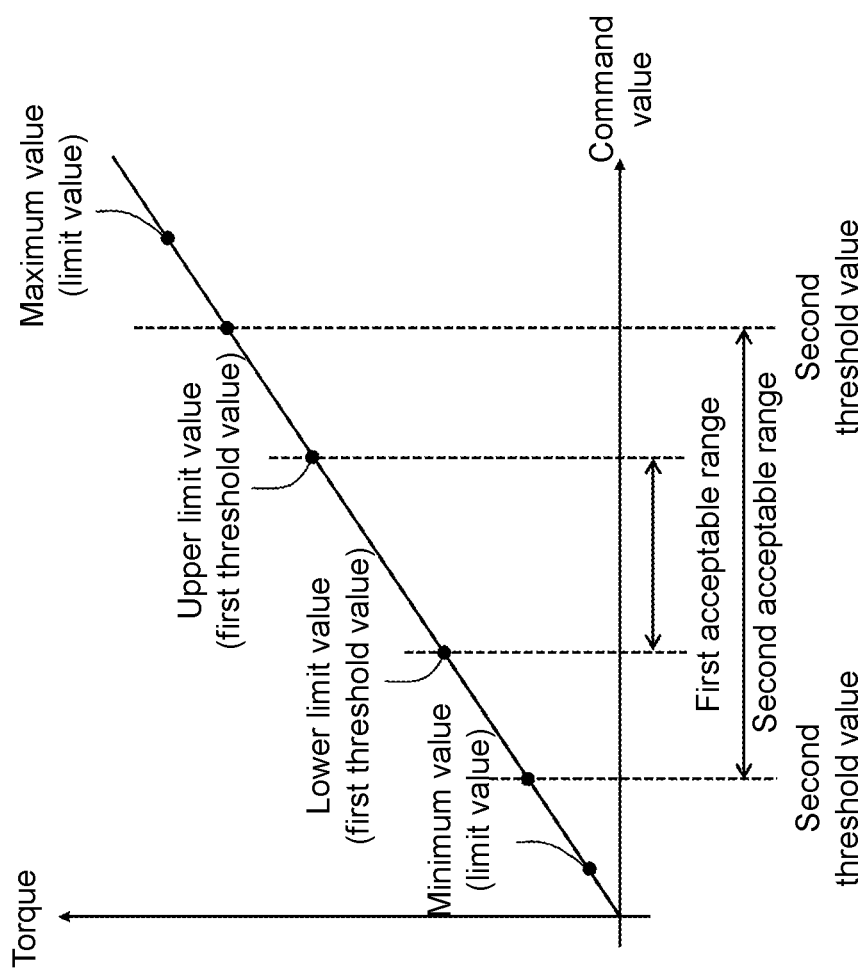
FIG. 11B is a diagram schematically illustrating another example of the method of determining a second threshold value.

FIG. 11A schematically illustrates an example in which the limit values of the estimated numerical value range are employed as the second threshold value 62. FIG. 11B schematically illustrates an example in which a value between the limit values of the estimated numerical value range and the first threshold value 60 is employed as the second threshold value 62. In the example illustrated in FIGS. 11A and 11B, the horizontal axis of the graph corresponds to a command value (an input) for the production device 3 and the vertical axis of the graph corresponds to a torque (an output) for the servo motor.

The first threshold value 60 is given in advance before the second threshold value 62 is determined. The first threshold value 60 may be determined in advance by a user who uses the production device 3 or may be determined in advance in the production device 3 or the control device 2. The first threshold value 60 may be used as a constraint condition for the command value for the production device 3 in a case in which the production device 3 or the control device 2 is manually operated by a user instead of a case in which prediction control of the production device 3 is performed using the prediction model 5. The control unit 11 may acquire the first threshold value 60 by inquiring of the control device 2 or the production device 3 via the network or the like. The learning device 1 may store the first threshold value 60 in the storage unit 12 or the like in advance or may acquire the first threshold value 60 by an operator's designation.

In the example illustrated in FIG. 11A, when the maximum value of the numerical value range estimated in Step S103 is greater than the upper limit value of the first acceptable range (the first threshold value 60), the control unit 11 employs the maximum value as the second threshold value 62 in Step S104. Accordingly, the control unit 11 can employ a value greater than the upper limit value of the first acceptable range as the second threshold value 62. The second threshold value 62 is handled as the upper limit value of a second acceptable range.

When the minimum value of the numerical value range estimated in Step S103 is less than the lower limit value of the first acceptable range (the first threshold value 60), the control unit 11 employs the minimum value as the second threshold value 62 in Step S104. Accordingly, the control unit 11 can employ a value less than the lower limit value of the first acceptable range as the second threshold value 62. The second threshold value 62 is handled as the lower limit value of the second acceptable range.

On the other hand, in the example illustrated in FIG. 11B, when the maximum value of the numerical value range estimated in Step S103 is greater than the upper limit value of the first acceptable range (the first threshold value 60), the control unit 11 employs a value between the maximum value and the upper limit value as the second threshold value 62 in Step S104. At this time, the value employed as the second threshold value 62 may be appropriately determined depending on embodiments. For example, the control unit 11 may employ an average value of the maximum value of the estimated numerical value range and the upper limit value of the first acceptable range as the second threshold value 62. Accordingly, the control unit 11 can employ a value greater than the upper limit value of the first acceptable range as the second threshold value 62. The second threshold value 62 is handled as the upper limit value of the second acceptable range.

When the minimum value of the numerical value range estimated in Step S103 is less than the lower limit value of the first acceptable range (the first threshold value 60), the control unit 11 employs a value between the minimum value and the lower limit value as the second threshold value 62 in Step S104. At this time, similarly to the case of the upper limit value, the value employed as the second threshold value 62 may be appropriately determined depending on embodiments. For example, the control unit 11 may employ an average value of the minimum value of the estimated numerical value range and the lower limit value of the first acceptable range as the second threshold value 62. Accordingly, the control unit 11 can employ a value less than the lower limit value of the first acceptable range as the second threshold value 62. The second threshold value 62 is handled as the lower limit value of the second acceptable range.

As illustrated in FIGS. 11A and 11B, the second acceptable range defined by the second threshold value 62 which is determined using one of the aforementioned methods is broader than the first acceptable range. Accordingly, the control unit 11 according to this embodiment can determine the second threshold value 62 for the command value on the basis of the numerical value range estimated in Step S103 such that the first acceptable range defined by the preset first threshold value 60 is extended using one of the aforementioned methods.

At this time, the control unit 11 may determine the second threshold value 62 such that a preset safety condition is satisfied. The safety condition may be appropriately defined depending on embodiments such that the operation of the production device 3 can be safely controlled. The control unit 11 may acquire information indicating the safety condition by inquiring of the control device 2 or the production device 3 via the network or the like. The learning device 1 may store information indicating the safety condition in the storage unit 12 or the like in advance or may acquire the information indicating the safety condition by an operator's designation.

For example, the safety condition may be defined by a safety-control threshold value which is designated in advance by a user or a maker of the production device 3 or the like. When the safety-control threshold value is set for the upper limit value of the acceptable range of the command value, the control unit 11 may determine whether the value determined in Step S104 (the upper limit value of the second acceptable range) is equal to or less than the safety-control threshold value. When the value determined in Step S104 is equal to or less than the safety-control threshold value, the control unit 11 may employ the determined value as the second threshold value 62 (that is, the upper limit value of the second acceptable range). On the other hand, otherwise, the control unit 11 may correct the value to be equal to or less than the safety-control threshold value and employ the corrected value as the second threshold value 62.

Similarly, when the safety-control threshold value is set for the lower limit value of the acceptable range of the command value, the control unit 11 may determine whether the value determined in Step S104 (the lower limit value of the second acceptable range) is equal to or greater than the safety-control threshold value. When the value determined in Step S104 is equal to or greater than the safety-control threshold value, the control unit 11 may employ the determined value as the second threshold value 62 (that is, the lower limit value of the second acceptable range). On the other hand, otherwise, the control unit 11 may correct the value to be equal to or greater than the safety-control threshold value and employ the corrected value as the second threshold value 62.

For example, the safety condition may be defined by simulating the operation of the production device 3 or actually driving the production device 3. In this case, the control unit 11 may determine whether the production device 3 can be safely operated when the value determined as the second threshold value 62 in Step S104 is employed as the command value on the basis of the result of simulation or actual driving. When it is determined that the production device 3 can be safely operated, the control unit 11 may employ the value determined in Step S104 as the second threshold value 62. On the other hand, when it is determined that the production device 3 cannot be safely operated, the control unit 11 may correct the value to safely operate the production device 3 and employ the corrected value as the second threshold value 62. When the second threshold value 62 is determined, the control unit 11 causes the process routine to progress to Step S105.

When the maximum value of the numerical value range estimated in Step S103 is equal to or less than the upper limit value of the first acceptable range, the control unit 11 may skip the process of determining the upper limit value of the second acceptable range (the second threshold value 62) using one of the aforementioned methods. Similarly, when the minimum value of the numerical value range estimated in Step S103 is equal to or greater than the lower limit value of the first acceptable range, the control unit 11 may skip the process of determining the second threshold value 62 using one of the aforementioned methods. The methods of determining the upper limit value and the lower limit value of the second acceptable range may be different from each other. For example, the control unit 11 may employ the method illustrated in FIG. 11A as the method of determining the upper limit value of the second acceptable range and employ the method illustrated in FIG. 11B as the method of determining the lower limit value of the second acceptable range.

FIGS. 11A and 11B schematically illustrate an example of a relationship between a command value (an input) for the production device 3 and a torque (an output) of the servo motor that drives the upper mold 32. In the aforementioned description, the first threshold value 60 and the second threshold value 62 are set for the command value. However, the forms of the first threshold value 60 and the second threshold value 62 may not be limited to the example. For example, the first threshold value 60 and the second threshold value 62 may be set for an output of a subject device (the torque of the servo motor in this embodiment), whereby the acceptable range of the command value may be indirectly defined.

(Step S105)

In Step S105, the control unit 11 serves as the learning processing unit 112, and stores information indicating the configuration of the decision tree (the learned prediction model 5) constructed by machine learning and the branching conditions as the learning result data 125 in the storage unit 12. The control unit 11 also serves as the threshold value determining unit 114 and stores the second threshold value 62 determined in Step S104 in the storage unit 12. Accordingly, the control unit 11 ends the learning process according to this operation example.

After the process of Step S105 has been completed, the control unit 11 may transmit the generated learning result data 125 and the second threshold value 62 to the control device 2. The control unit 11 may periodically update the learning result data 125 and the second threshold value 62 by periodically performing the learning processes of Steps S101 to S105. The control unit 11 may periodically update the learning result data 125 and the second threshold value 62 stored in the control device 2 by transmitting the generated learning result data 125 and the second threshold value 62 to the control device 2 whenever the learning processes are performed. For example, the control unit 11 may store the generated learning result data 125 and the second threshold value 62 in a data server such as a network attached storage (NAS). In this case, the control device 2 may acquire the learning result data 125 and the second threshold value 62 from the data server. The learning result data 125 and the second threshold value 62 generated by the learning device 1 may be combined into the control device 2 in advance.

[Control Device]

Figure 12:
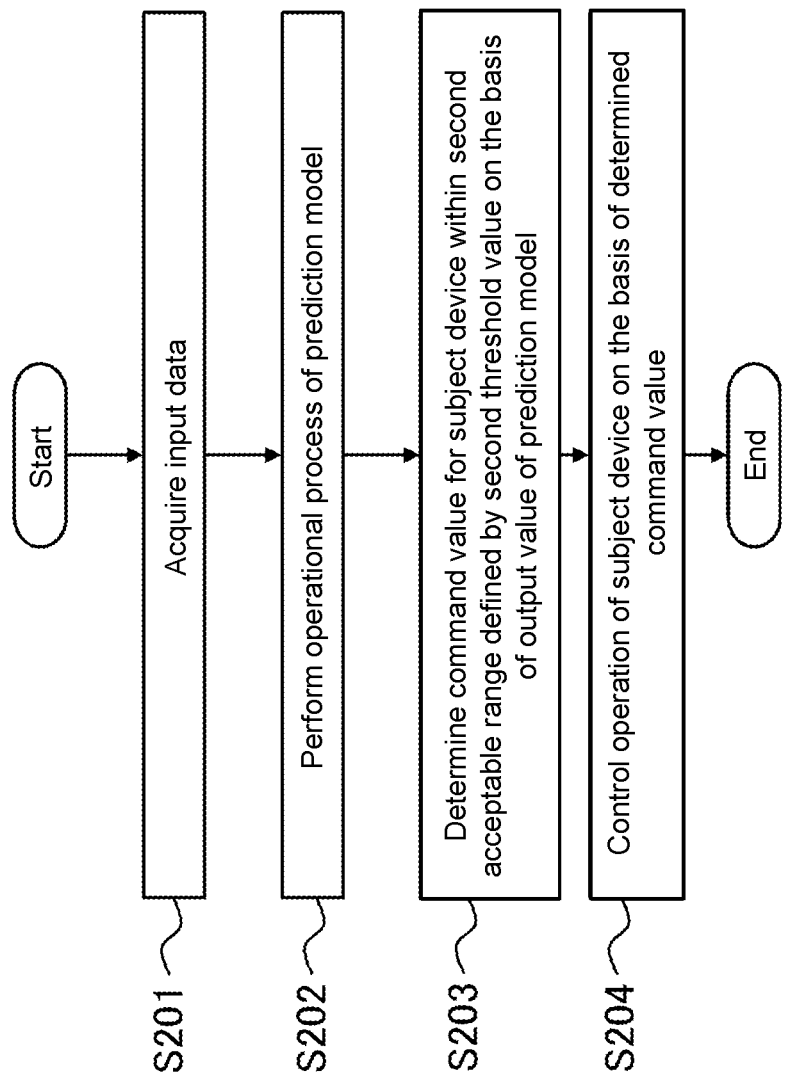
FIG. 12 is a diagram illustrating an example of a process routine which is performed by the control device according to the embodiment.

An operation example of the control device 2 in an operational phase will be described below with reference to FIG. 12. FIG. 12 is a flowchart illustrating an example of a process routine which is performed by the control device 2. The process routine which will be described below is only an example and the individual processes may be modified. The process routine which will be described below can be appropriately subjected to omission, replacement, and addition of a step depending on embodiments.

(Step S201)

In Step S201, the control unit 21 serves as the input data acquiring unit 211 and acquires input data associated with a factor in the operational phase.

In this embodiment, as described above, the prediction model 5 is constructed by machine learning using the learning data sets 121 including the feature value 1211 of a workpiece 40 and the attribute value 1212 of the environment in which a product 41 is produced as first data. Accordingly, in Step S201, the control unit 21 acquires a feature value 71 of a workpiece 40 and an attribute value 72 of the environment in which a product 41 is produced.

The feature value 71 and the attribute value 72 may be the same type as the feature value 1211 and the attribute value 1212. The methods of acquiring the feature value 71 and the attribute value 72 may be appropriately selected depending on embodiments. For example, various sensors configured to measure the feature value 71 of a workpiece 40 (for example, hardness) and the attribute value 72 of an environment (for example, temperature) may be provided in the production device 3. Known sensor may be appropriately used as the various sensors depending on the types of the feature value 71 and the attribute value 72 which are to be measured. In this case, the control unit 21 can acquire the feature value 71 and the attribute value 72 from various sensors which are provided in the production device 3. When the feature value 71 and the attribute value 72 are acquired, the control unit 21 causes the process routine to progress to Step S202.

(Step S202)

In Step S202, the control unit 21 serves as the prediction operation unit 212 and performs the operational process of the prediction model 5 by inputting the acquired input data (the feature value 71 and the attribute value 72) to the prediction model 5. Accordingly, the control unit 21 acquires an output value corresponding to the prediction result of the command value adapted to production of a product 41 using the production device 3 from the prediction model 5.

In this embodiment, the prediction model 5 is constituted by a decision tree, and information indicating the configuration of the prediction model 5 and the branching conditions of the paths is included in the learning result data 125. Therefore, the control unit 21 performs setting of the prediction model 5 with reference to the learning result data 125. Through this setting process, the control unit 21 falls into a state in which a search process of the decision tree (the prediction model 5) can be started.

Then, the control unit 21 performs a search process of tracing the links from the root node to the leaf nodes in the decision tree (the prediction model 5). Specifically, when the search process has never been performed, the control unit 21 determines whether the input data (the feature value 71 and the attribute value 72) satisfies the branching condition set for the root node as the search process of the decision tree.

Then, on the basis of this determination result, the control unit 21 causes the search process to progress to the corresponding node in the second stage (the intermediate node N1 or the intermediate node N2 in the example illustrated in FIG. 7A).

Similarly, when the search process has been performed n times (where n is a natural number equal to or greater than 1), the search process has progressed to the intermediate node in the (n+1)-th stage. In this case, the control unit 21 determines whether the input data satisfies the branching conditions set for the corresponding intermediate node in the (n+1)-th stage. Then, on the basis of this determination result, the control unit 21 causes the search process to progress to the corresponding node in the (n+2)-th stage.

When the search process reaches a certain leaf node of the decision tree, the operational process of the prediction model 5 is completed. In this embodiment, as the output value corresponding to the prediction result of the command value adapted to production of a product 41, the correction values 73 for the reference value 70 of the command value are correlated with the leaf nodes of the decision tree of the prediction model 5. Accordingly, when the operational process of the prediction model 5 is completed, the control unit 21 can acquire the correction value 73 correlated with the leaf node reached by the search process as the output value of the prediction model. When this output value is acquired, the control unit 21 causes the process routine to progress to Step S203.

(Step S203)

In Step S203, the control unit 21 serves as the prediction operation unit 212 and determines the command value for the production device 3 within the second acceptable range defined by the second threshold value 62 determined by the learning device 1 on the basis of the acquired output value of the prediction model 5.

In this embodiment, in Step S202, the control unit 21 acquires the correction value 73 for the reference value 70 as the output value of the prediction model 5. Accordingly, the control unit 21 calculates a predicted value of the command value by correcting (for example, performing addition or subtraction) the reference value 70 using the acquired correction value 73. Then, the control unit 21 determines whether the calculated predicted value is in the second acceptable range defined by the second threshold value 62.

When the calculated predicted value is in the second acceptable range, the control unit 21 determines the calculated predicted value as the command value 75. On the other hand, when the calculated predicted value is not in the second acceptable range, the control unit 21 appropriately corrects the calculated predicted value to be in the second acceptable range, and determines the corrected value as the command value 75. For example, when the calculated predicted value is greater than the upper limit value of the second acceptable range, the control unit 21 may determine the upper limit value of the second acceptable range as the command value 75. For example, when the calculated predicted value is less than the lower limit value of the second acceptable range, the control unit 21 may determine the lower limit value of the second acceptable range as the command value 75. Accordingly, when the command value 75 is determined in the second acceptable range, the control unit 21 causes the process routine to progress to Step S204.

(Step S204)

In Step S204, the control unit 21 serves as the operation control unit 213 and controls the operation of the production device 3 on the basis of the determined command value 75. The method of controlling the operation of the production device 3 on the basis of the command value 75 may be appropriately selected depending on embodiments.

In this embodiment, the production device 3 is a press machine and includes the servo driver 31 that drives the upper mold 32. Accordingly, the command value 75 may represent the number of pulses for defining an amount of driving of the servo motor. In this case, the control unit 21 transmits the command value 75 to the servo driver 31 of the production device 3 via the external interface 24. The servo driver 31 drives the servo motor on the basis of the command value 75 received from the control device 2. Accordingly, the control unit 21 can control the operation of the production device 3 on the basis of the determined command value 75. When the operation of the production device 3 is controlled, the control unit 21 ends the processes according to the form of the command value.

The form of the command value 75 is not limited to this example. The command value 75 may be expressed, for example, by an intermediate index such as an amount of driving of the servo motor or an amount of movement of the upper mold 32. In this case, the control unit 21 may transmit the command value 75 expressed by the intermediate index to the production device 3 without any change, or may convert the command value 75 expressed by the intermediate index to a form which can be directly used such as the number of pulses and transmit the converted command value 75 to the production device 3.

(After Ending)

As described above, the control unit 21 ends a series of processes of controlling the operation of the production device 3 according to this operation example. The control unit 21 can continue to control the operation of the production device 3 by repeatedly performing this series of processes.

The control device 2 may be configured to switch between a mode (a prediction control mode) in which the operation of the production device 3 is predicted and controlled using the prediction model 5 and a mode (a manual control mode) in which the operation of the production device 3 is controlled according to a user's operation. In this case, when the operation mode is set to the prediction control mode, the control unit 21 may perform the processes of Steps S201 to S204. When the operation mode is set to the manual control mode, the control unit 21 may receive designation of a command value from a user and control the operation of the production device 3 on the basis of the designated command value. At this time, in the manual control mode, the control unit 21 may use the first threshold value 60 as the constraint condition. That is, the control unit 21 may not receive designation of a value exceeding the first acceptable range defined by the first threshold value 60 but receive designation of a command value within the first acceptable range.

[Features]

As described above, in this embodiment, the second acceptable range defined by the second threshold value 62 which is set to extend the first acceptable range in Step S104 instead of the first acceptable range defined by the preset first threshold value 60 is used as the constraint condition of the command value at the time of determining the command value for the production device 3 in Step S203. Accordingly, even when the first acceptable range is set to be narrower due to excessive consideration of safety, the acceptable range of the command value 75 which is used for control of the operation of the production device 3 can be extended. That is, some command values 75 which are likely to be rejected when the first acceptable range is used as the constraint condition can be used to control the operation of the production device 3 in Step S204.

In Step S101, the learning data sets 121 are collected to realize control of the operation suitable for a specific case. Accordingly, it is possible to safely control the operation of the production device 3 with the command value designated by the second data (the correction value 1213) in each learning data set 121. As a result, in Step S104, the second threshold value 62 defining the second acceptable range can be determined such that safety of the operation of the production device 3 is secured on the basis of the numerical value range estimated from the distribution of the second data in the learning data set 121. Particularly, it is possible to reliably secure safety of the operation of the production device 3 by determining the second threshold value 62 such that a preset safety condition is satisfied in Step S104. Accordingly, with the control system 100 according to this embodiment, it is possible to perform prediction control in which performance of the prediction model 5 can be sufficiently exerted while securing safety of the operation of the production device 3.

4 Modified Example

While embodiments of the invention have been described above in detail, the aforementioned description is only an example of the invention. The embodiments can be improved or modified in various forms without departing from the scope of the invention. For example, the following modifications can be made. In the following description, the same elements as in the aforementioned embodiments will be referred to by the same reference signs and the same description as in the aforementioned embodiments will be omitted. The following modified examples can be appropriately combined.

<4.1>

In the aforementioned embodiments, the first data includes both the feature value 1211 of the workpiece 40 and the attribute value 1212 of the environment in which the product 41 is produced. Accordingly, both the feature value 71 of the workpiece 40 and the attribute value 72 of the environment in which the product 41 is produced are used as the input of the prediction model 5. However, the input of the prediction model 5 is not limited to this example.

For example, one of the feature value of a workpiece 40 and the attribute value of an environment in which a product is produced may be omitted. That is, the first data may include at least one of the feature value 1211 of a workpiece 40 and the attribute value 1212 of the environment in which a product 41 is produced. Accordingly, the prediction model 5 may be constructed to predict the command value adapted to production of a product 41 in response to an input of at least one of the feature value 71 of a workpiece 40 and the attribute value 72 of the environment in which a product 41 is produced.

The first data may be data associated with all types of factors that can determine an operation of a subject device. The control device 2 may be configured to control a subject device of a type other than the production device 3. In this case, the prediction model 5 may be constructed to predict the command value adapted to a situation indicated by input data in response to an input of the same type of data as the first data.

<4.2>

In the aforementioned embodiment, the second data includes the correction value 1213 for the reference value of the command value and thus the prediction model 5 is configured to output the correction value 73 for the reference value 70 of the command value. However, the output form of the prediction model 5 is not limited to such an example and may be appropriately determined depending on embodiments. For example, the prediction model 5 may be configured to output the command value itself. In this case, the second data may include the command value itself.

<4.3>

In the aforementioned embodiment, the prediction model 5 is constituted by a decision tree. However, the configuration of the prediction model 5 is not limited to such an example as long as it can predict a command value for a subject device (for example, the production device 3) at a time point (a future time point) after a time point at which the prediction process is performed, and may be appropriately selected depending on embodiments. For example, a learning model other than a decision tree such as a neural network or a support vector machine may be used as the prediction model 5. A model (for example, a predetermined function) other than a learning model may be used as the prediction model 5.

What is claimed is:
1. A control system comprising:
a first processor configured to:
    acquire a plurality of learning data sets of which each includes a combination of first data associated with a factor determining an operation of a subject device and second data associated with a command value for the subject device which is adapted to the factor indicated by the first data;
    construct a prediction model that outputs a value corresponding to the second data when the first data is input for each of the acquired plurality of learning data sets;
    estimate a possible numerical value range of the command value from a distribution of command values designated by the second data in the acquired plurality of learning data sets, wherein the distribution of the command values is approximated by one of a normal distribution, a gamma distribution and an exponential distribution; and
    determine a second threshold value for the command value for the subject device on the basis of the estimated numerical value range such that a first acceptable range is extended, wherein the first acceptable range is defined by a first threshold value preset for the command value for the subject device; and
a second processor configured to:
    acquire input data associated with the factor in an operational phase;
    acquire an output value from the prediction model by inputting the acquired input data to the prediction model and to determine the command value for the subject device within a second acceptable range which is defined by the determined second threshold value on the basis of the acquired output value,
        wherein, the second acceptable range has a second upper limit value and a second lower limit value, and the second upper limit value is one of the determined second threshold value or the first threshold value, and the second lower limit value is the other one of the determined second threshold value or the first threshold value; and
    control the operation of the subject device on the basis of the determined command value.

2. The control system according to claim 1, wherein the first processor further configured to employ a limit value of the estimated numerical value range or a value between the first threshold value and the limit value as the second threshold value.

3. The control system according to claim 1, wherein the first threshold value is an upper limit value of the first acceptable range, and
wherein the first processor further configured to employ a value greater than the upper limit value as the second threshold value.

4. The control system according to claim 1, wherein the first threshold value is a lower limit value of the first acceptable range, and
wherein the first processor further configured to employ a value less than the lower limit value as the second threshold value.

5. The control system according to claim 1, wherein first processor further configured to determine the second threshold value such that a preset safety condition is satisfied.

6. The control system according to claim 1, wherein the second data includes a correction value for a reference value of the command value.

7. The control system according to claim 1, wherein the subject device is a production device that produces a product from a workpiece, and
wherein each of the first data and the input data includes at least one of a feature value of the workpiece and an attribute value of an environment in which the product is produced.

8. A control method which is performed by a computer, the control method comprising:
acquiring a plurality of learning data sets of which each includes a combination of first data associated with a factor determining an operation of a subject device and second data associated with a command value for the subject device which is adapted to the factor indicated by the first data;
constructing a prediction model that outputs a value corresponding to the second data when the first data is input for each of the acquired plurality of learning data sets;
estimating a possible numerical value range of the command value from a distribution of command values designated by the second data in the acquired plurality of learning data sets, wherein the distribution of the command values is approximated by one of a normal distribution, a gamma distribution and an exponential distribution;
determining a second threshold value for the command value for the subject device on the basis of the estimated numerical value range such that a first acceptable range is extended, wherein the first acceptable range is defined by a first threshold value preset for the command value for the subject device;
acquiring input data associated with the factor in an operational phase;
acquiring an output value from the prediction model by inputting the acquired input data to the prediction model;
determining the command value for the subject device within a second acceptable range which is defined by the determined second threshold value on the basis of the acquired output value,
wherein, the second acceptable range has a second upper limit value and a second lower limit value, and the second upper limit value is one of the determined second threshold value or the first threshold value, and the second lower limit value is the other one of the determined second threshold value or the first threshold value; and
controlling the operation of the subject device on the basis of the determined command value.

9. A learning device comprising:
a first processor configured to:
acquire a plurality of learning data sets of which each includes a combination of first data associated with a factor determining an operation of a subject device and second data associated with a command value for the subject device which is adapted to the factor indicated by the first data;
construct a prediction model that outputs a value corresponding to the second data when the first data is input for each of the acquired plurality of learning data sets;
estimate a possible numerical value range of the command value from a distribution of command values designated by the second data in the acquired plurality of learning data sets, wherein the distribution of the command values is approximated by one of a normal distribution, a gamma distribution and an exponential distribution; and
determine a second threshold value for the command value for the subject device on the basis of the estimated numerical value range such that a first acceptable range is extended, wherein the first acceptable range is defined by a first threshold value preset for the command value for the subject device,
acquire a second acceptable range wherein the second acceptable range has a second upper limit value and a second lower limit value, and the second upper limit value is one of the determined second threshold value or the first threshold value, and the second lower limit value is the other one of the determined second threshold value or the first threshold value.

10. A control device comprising:
a second processor configured to:
acquire input data associated with a factor determining an operation of a subject device;
acquire an output value from a prediction model by inputting the acquired input data to the prediction model and to determine a command value for the subject device within the second acceptable range which is defined by a second threshold value which is determined by the learning device according to claim 9 on the basis of the acquired output value; and
control the operation of the subject device on the basis of the determined command value.

11. A learning method which is performed by a computer, the learning method comprising:
acquiring a plurality of learning data sets of which each includes a combination of first data associated with a factor determining an operation of a subject device and second data associated with a command value for the subject device which is adapted to the factor indicated by the first data;
constructing a prediction model that outputs a value corresponding to the second data when the first data is input for each of the acquired plurality of learning data sets;
estimating a possible numerical value range of the command value from a distribution of command values designated by the second data in the acquired plurality of learning data sets, wherein the distribution of the command values is approximated by one of a normal distribution, a gamma distribution and an exponential distribution; and determining a second threshold value for the command value for the subject device on the basis of the estimated numerical value range such that a first acceptable range is extended, wherein the first acceptable range is defined by a first threshold value preset for the command value for the subject device, acquiring a second acceptable range wherein the second acceptable range has a second upper limit value and a second lower limit value, and the second upper limit value is one of the determined second threshold value or the first threshold value, and the second lower limit value is the other one of the determined second threshold value or the first threshold value.

12. A non-transitory computer-readable recording medium comprising a learning program causing a computer to perform:

acquiring a plurality of learning data sets of which each includes a combination of first data associated with a factor determining an operation of a subject device and second data associated with a command value for the subject device which is adapted to the factor indicated by the first data;

constructing a prediction model that outputs a value corresponding to the second data when the first data is input for each of the acquired plurality of learning data sets;

estimating a possible numerical value range of the command value from a distribution of command values designated by the second data in the acquired plurality of learning data sets, wherein the distribution of the command values is approximated by one of a normal distribution, a gamma distribution and an exponential distribution; and determining a second threshold value for the command value for the subject device on the basis of the estimated numerical value range such that a first acceptable range is extended, wherein the first acceptable range is defined by a first threshold value preset for the command value for the subject device, acquiring a second acceptable range wherein the second acceptable range has a second upper limit value and a second lower limit value, and the second upper limit value is one of the determined second threshold value or the first threshold value, and the second lower limit value is the other one of the determined second threshold value or the first threshold value.

13. The control system according to claim 2, wherein the first threshold value is an upper limit value of the first acceptable range, and wherein the first processor further configured to employ a value greater than the upper limit value as the second threshold value.

14. The control system according to claim 2, wherein the first threshold value is a lower limit value of the first acceptable range, and wherein the first processor further configured to employ a value less than the lower limit value as the second threshold value.

15. The control system according to claim 2, wherein the first processor further configured to determine the second threshold value such that a preset safety condition is satisfied.

16. The control system according to claim 3, wherein the first processor further configured to determine the second threshold value such that a preset safety condition is satisfied.

17. The control system according to claim 4, wherein the first processor further configured to determine the second threshold value such that a preset safety condition is satisfied.

18. The control system according to claim 13, wherein the first processor further configured to determine the second threshold value such that a preset safety condition is satisfied.

19. The control system according to claim 14, wherein the first processor further configured to determine the second threshold value such that a preset safety condition is satisfied.

20. The control system according to claim 2, wherein the second data includes a correction value for a reference value of the command value.

* * * * *